(12) United States Patent
Sun

(10) Patent No.: US 12,361,046 B2
(45) Date of Patent: Jul. 15, 2025

(54) GEO-FENCE BASED COORDINATE DATA PROCESSING METHOD AND APPARATUS, AND COMPUTER DEVICE

(71) Applicant: TENCENT TECHNOLOGY (SHENZHEN) COMPANY LIMITED, Shenzhen (CN)

(72) Inventor: Funing Sun, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 414 days.

(21) Appl. No.: 17/394,335

(22) Filed: Aug. 4, 2021

(65) Prior Publication Data
US 2021/0365489 A1    Nov. 25, 2021

Related U.S. Application Data

(63) Continuation of application No. PCT/CN2020/089867, filed on May 12, 2020.

(30) Foreign Application Priority Data

May 15, 2019    (CN) .......................... 201910404128.7

(51) Int. Cl.
*G06F 16/387*    (2019.01)
*G06F 16/334*    (2025.01)
(Continued)

(52) U.S. Cl.
CPC ........ *G06F 16/387* (2019.01); *G06F 16/3344* (2019.01); *G06F 16/335* (2019.01); *G06F 16/35* (2019.01); *G06F 40/30* (2020.01)

(58) Field of Classification Search
CPC .... G06F 16/387; G06F 16/35; G06F 16/3344; G06F 16/335; G06F 40/30
See application file for complete search history.

(56) References Cited

U.S. PATENT DOCUMENTS 9,473,890 B1 * 10/2016 Liu .................. H04W 52/0229
11,176,180 B1 * 11/2021 Gudur ................. G06F 16/3344
(Continued)

FOREIGN PATENT DOCUMENTS

| CN | 101350012 A | 1/2009 |
|---|---|---|
| CN | 102737060 A | 10/2012 |

(Continued)

OTHER PUBLICATIONS

The European Patent Office (EPO) The Extended European Search Report for 20805432.0 May 2, 2022 9 Pages (including translation).
(Continued)

*Primary Examiner* — Tony Wu
(74) *Attorney, Agent, or Firm* — ANOVA LAW GROUP, PLLC

(57) ABSTRACT

A geo-fence based coordinate data processing method includes: obtaining an address text and a corresponding fence identifier; performing semantic extension on the address text to obtain a plurality of extended addresses; converting each of the extended addresses into corresponding geographic coordinates; recognizing key address elements in the plurality of extended addresses; screening the geographic coordinates depending on whether an extended address corresponding to a geographic coordinates includes the recognized key address element and whether the geographic coordinate is located in a target fence corresponding to the fence identifier; and determining, according to a clustering feature of each of the screened geographic coordinates, one of the screened geographic coordinates as a processed coordinate.

20 Claims, 11 Drawing Sheets

(51) Int. Cl.
*G06F 16/335* (2019.01)
*G06F 16/35* (2025.01)
*G06F 40/30* (2020.01)

(56) References Cited

U.S. PATENT DOCUMENTS

| | | | |
|---|---|---|---|
| 2011/0161334 A1 | 6/2011 | Sivakkolundhu et al. | |
| 2012/0265778 A1* | 10/2012 | Chen | |
| 2013/0204876 A1* | 8/2013 | Szucs | G06F 16/313 |
| | | | 707/738 |
| 2014/0280160 A1* | 9/2014 | Scriffignano | G06F 16/29 |
| | | | 707/737 |
| 2015/0260849 A1* | 9/2015 | Eastman | G01C 21/20 |
| | | | 701/482 |
| 2017/0067748 A1* | 3/2017 | Glover | G01C 21/3679 |
| 2018/0322144 A1 | 11/2018 | Jones | |

FOREIGN PATENT DOCUMENTS

| | | |
|---|---|---|
| CN | 103186524 A | 7/2013 |
| CN | 104820905 A | 8/2015 |
| CN | 105787111 A | 7/2016 |
| CN | 107145577 A | 9/2017 |
| CN | 107368480 A | 11/2017 |
| CN | 107656913 A | 2/2018 |
| CN | 109376205 A | 2/2019 |
| CN | 109408781 A | 3/2019 |
| CN | 109492066 A | 3/2019 |
| CN | 109684440 A | 4/2019 |
| CN | 110175216 A | 8/2019 |
| JP | 2012107974 A | 6/2012 |
| WO | 2012172160 A1 | 12/2012 |

OTHER PUBLICATIONS

The State Intellectual Property Office of the People's Republic of China (SIPO) Office Action 1 for for 201910404128.7 Nov. 11, 2020 9 Pages (including translation).

The World Intellectual Property Organization (WIPO) International Search Report for PCT/CN2020/089867 Aug. 12, 2020 6 Pages (including translation).

* cited by examiner

| Peripheral retrieval | | |
|---|---|---|
| 1 | Neighborhood 1 | Select |
| 2 | No. 4 building, Neighborhood 1 | Select |
| 3 | No. 5 building, Neighborhood 1 | Select |
| 4 | No. 1 building, Neighborhood 1 | Select |
| Retrieval result | | |
| KEY | Reference point | Select |
| Operation | | |
| Address | Store E, Village C, District B, City A | |
| Coordinates | 112.56060728.267369 | |
| Processing result | Manually processed | |
| | Cancel   Confirm | |

FIG. 6

GEO-FENCE BASED COORDINATE DATA PROCESSING METHOD AND APPARATUS, AND COMPUTER DEVICE

CROSS-REFERENCES TO RELATED APPLICATIONS

This application is a continuation application of PCT Patent Application No. PCT/CN2020/089867, entitled "GEO-FENCE BASED COORDINATE DATA PROCESSING METHOD AND APPARATUS, AND COMPUTER DEVICE" and filed on May 12, 2020, which claims priority to Chinese Patent Application No. 201910404128.7, filed on May 15, 2019 and entitled "COORDINATE ERROR-CORRECTING METHOD AND APPARATUS, AND COMPUTER DEVICE", the entire contents of both of which are incorporated herein by reference.

FIELD OF THE TECHNOLOGY

The present disclosure relates to the field of computer technologies, and in particular, to a geo-fence based coordinate data processing method and apparatus, and a computer device.

BACKGROUND OF THE DISCLOSURE

Geocoding is often required in scenarios such as logistics transportation and route navigation. Geocoding refers to converting geographic location information described as an address into geographic coordinates that can be used for a geographic information system (GIS). For example, in logistics transportation, a waybill address is converted into geographic coordinates, and express items are automatically sorted according to the geographic coordinates; and a destination address is converted into geographic coordinates in UAV navigation, and flight route navigation is performed according to the geographic coordinates. However, there are often errors at geographic coordinates obtained directly based on a geocoding service. Therefore, there is an urgent need for a method for obtaining more accurate geographic coordinates.

In the related art, text error correction processing is performed on the geographic location information based on an error correction model, and then geocoding is performed according to the geographic location information after the error correction processing. This manner not only requires extensive labeling of sample data for model training, resulting in low processing efficiency is reduced; and because the sample coverage is limited, the processing effect is poor.

SUMMARY

Based on the foregoing, a geo-fence based coordinate data processing method and apparatus, a computer-readable storage medium, and a computer device are provided, which may improve processing efficiency and a processing effect.

A geo-fence based coordinate data processing method is provided, including: obtaining an address text and a fence identifier corresponding to the address text; performing semantic extension on the address text to obtain a plurality of extended addresses; converting each of the extended addresses into corresponding geographic coordinates; recognizing a key address element in the plurality of extended addresses; screening the geographic coordinates depending on whether an extended address corresponding to a geographic coordinates includes the recognized key address element and whether the geographic coordinate is located in a target fence corresponding to the fence identifier, to obtain one or more screened geographic coordinates; and determining, according to a clustering feature of each of the screened geographic coordinates, one of the screened geographic coordinates as a processed coordinate.

A geo-fence based coordinate data processing apparatus is provided, including: an address obtaining module, configured to obtain an address text and a corresponding fence identifier; a coordinate extension module, configured to perform semantic extension on the address text to obtain a plurality of extended addresses; and convert each of the extended addresses into corresponding geographic coordinates; and a coordinate screening module, configured to recognize a key address element in the plurality of extended addresses; screen the geographic coordinates depending on whether an extended address corresponding to a geographic coordinates includes the recognized key address element and whether the geographic coordinate is located in a target fence corresponding to the fence identifier, to obtain one or more screened geographic coordinates; and determine, according to a clustering feature of each of the screened geographic coordinates, one of the screened geographic coordinates as a processed coordinate.

A non-transitory computer-readable storage medium is provided, storing a computer program, the computer program, when executed by a processor, causing the processor to perform: obtaining an address text and a fence identifier corresponding to the address text; performing semantic extension on the address text to obtain a plurality of extended addresses; converting each of the extended addresses into corresponding geographic coordinates; recognizing a key address element in the plurality of extended addresses; screening the geographic coordinates depending on whether an extended address corresponding to a geographic coordinates includes the recognized key address element and whether the geographic coordinate is located in a target fence corresponding to the fence identifier, to obtain one or more screened geographic coordinates; and determining, according to a clustering feature of each of the screened geographic coordinates, one of the screened geographic coordinates as a processed coordinate.

A computer device is provided, including a memory and a processor, the memory storing a computer program, the computer program, when executed by the processor, causing the processor to perform the steps of the geo-fence based coordinate data processing method.

According to the geo-fence based coordinate data processing method and apparatus, the computer-readable storage medium, and the computer device, by performing semantic extension on an obtained address text, a plurality of extended addresses may be obtained, and the obtained extended addresses may be respectively converted into corresponding geographic coordinates, thereby obtaining a plurality of possible geographic coordinates. Compared with the related art in which unique geographic coordinates are obtained through geocoding only based on an address text, impact of irregular description of the address text or single information on the accuracy of the geographic coordinates obtained through the conversion may be reduced, and more possibilities are covered from a coordinate source level. In the plurality of geographic coordinates obtained through the extension, region constraint is performed based on a target fence, the geographic coordinates are screened depending on whether the recognized key address element are included, and some invalid geographic coordinates may be filtered. Final geographic coordinates are determined based on a clustering feature in the geographic coordinates obtained by the screening and filtering, and the accuracy of processed coordinates can be improved based on the multi-level screening and a high aggregation requirement. In addition, the corresponding processed coordinates may be quickly fed back by only providing the address text, the costs of manually obtaining the processed coordinates are reduced, and the timeliness of processing a coordinate data processing task can be improved.

BRIEF DESCRIPTION OF THE DRAWINGS

FIG. 6 is a schematic diagram of an interface of a peripheral retrieval auxiliary region according to an embodiment.

DESCRIPTION OF EMBODIMENTS

To make the objectives, technical solutions, and advantages of the present disclosure clearer and more understandable, the present disclosure is further described in detail below with reference to the accompanying drawings and the embodiments. It is to be understood that the specific embodiments described herein are only used for describing the present disclosure, but are not intended to limit the present disclosure.

Figure 1:
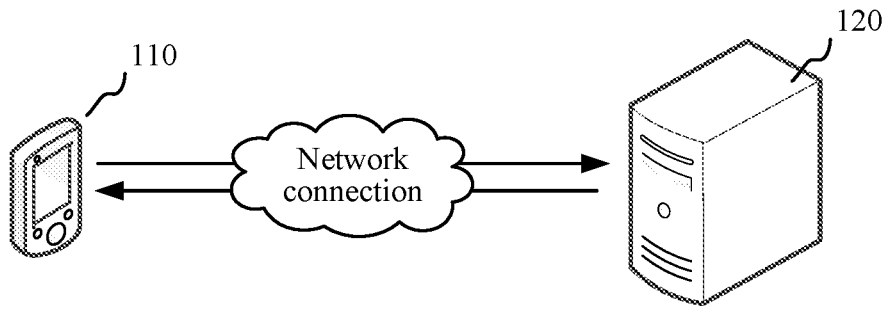
FIG. 1 is a diagram of an application environment of a geo-fence based coordinate data processing method according to an embodiment.

FIG. 1 is a diagram of an application environment of a geo-fence based coordinate data processing method according to an embodiment. Referring to FIG. 1, the geo-fence based coordinate data processing method is applicable to a geo-fence based coordinate data processing system. The geo-fence based coordinate data processing system includes a terminal 110 and a server 120. The terminal 110 and the server 120 are connected by a network. The geo-fence based coordinate data processing method may be completed in the terminal 110 or the server 120. The terminal 110 may acquire an address text that needs to obtain geographic coordinates and a corresponding fence identifier, and then the geographic coordinates are processed in the terminal 110 by using the geo-fence based coordinate data processing method. Alternatively, after acquiring an address text that needs to obtain geographic coordinates and a corresponding fence identifier, the terminal 110 may send the address text and the fence identifier to the server 120 through a network connection, and the server 120 processes the geographic coordinates by using the geo-fence based coordinate data processing method. The terminal 110 may be a desktop terminal or a mobile terminal, for example, the mobile terminal may be at least one of a mobile phone, a tablet computer, a notebook computer, and the like. The server 120 may be implemented by an independent server or a server cluster that includes a plurality of servers. A coordinate, as used herein, may refer to a set of coordinates that can identify/pinpoint a geographic location.

The processing the geographic coordinates may be extracting the geographic coordinates. In other words, the geo-fence based coordinate data processing method may be a method for extracting, according to an address text and a corresponding fence identifier, geographic coordinates corresponding to the address text. Alternatively, the processing the geographic coordinates may be performing error correction on existing geographic coordinates of an address text. In other word, the geo-fence based coordinate data processing method may be a method for performing, according to an address text and a corresponding fence identifier, error correction on existing geographic coordinates of the address text. In addition, the processing the geographic coordinates may be alternatively other processing of the geographic coordinates. This is not limited in this embodiment of the present disclosure.

Figure 2:
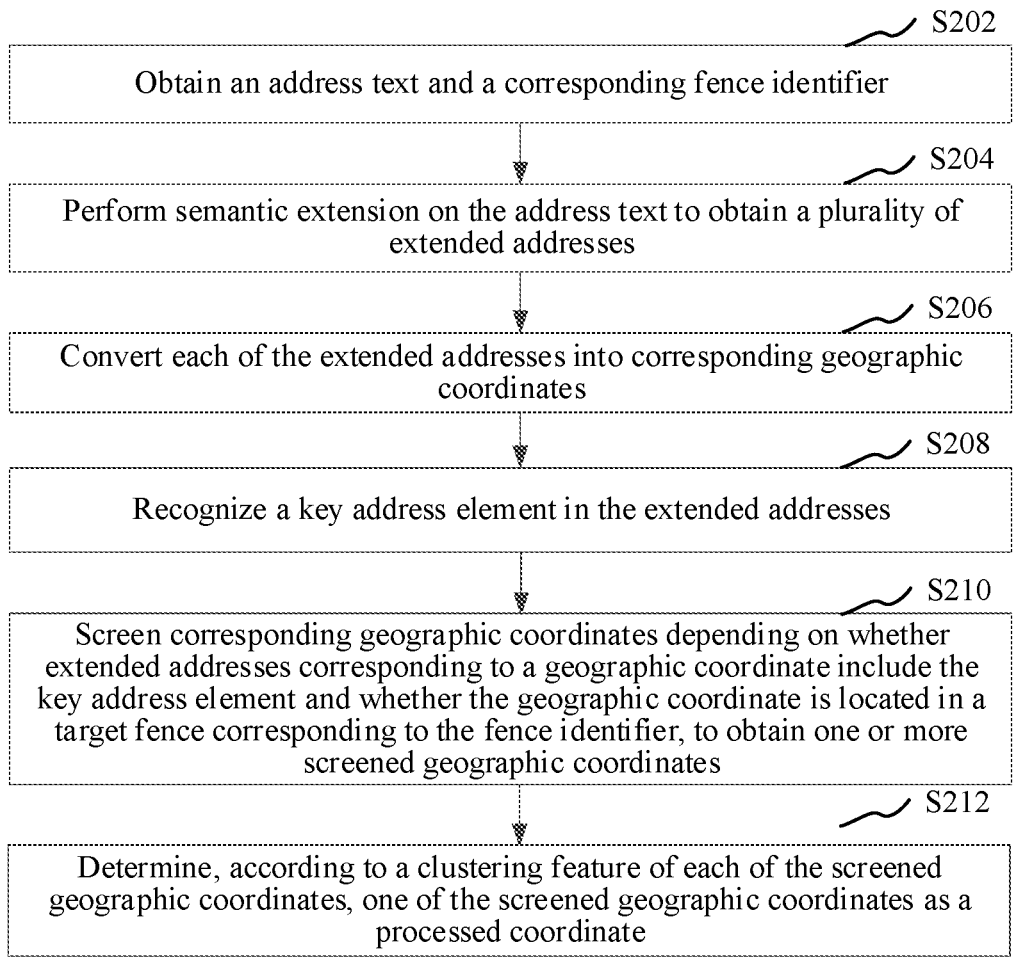
FIG. 2 is a schematic flowchart of a geo-fence based coordinate data processing method according to an embodiment.

As shown in FIG. 2, in an embodiment, a geo-fence based coordinate data processing method is provided. One embodiment is described by using an example in which the method is applicable to the terminal 110 or the server 120 in FIG. 1. Referring to FIG. 2, the geo-fence based coordinate data processing method includes the following steps.

S202. Obtain an address text and a corresponding fence identifier.

The address text is a text used for describing geographical location information of a point of interest (POI), for example, "Store E, Street D, Village C, District B, City A". The POI refers to a landmark, an attraction, or the like in a geographic information system, for example, a government department of a region, a commercial organization (for example, a gas station, a department store, a supermarket, a restaurant, a hotel, a convenience store, or a hospital), places of interest, a tourist attraction (for example, a park or a public toilet), and a transportation facility (for example, a station, a parking lot, a toll station, a speed limit sign). For example, in the examples, the "Store E" is a POI entity. The POI entity refers to a text fragment in the address text for describing a name of the POI.

The fence identifier is information that can uniquely identify a geo-fencing, for example, a fence code, a fence name, or a fence sequence number. The geo-fencing refers to a virtual geographic boundary formed by using a virtual fence. In a digital map, the geo-fencing may be a closed contour enclosed by a plurality of continuous coordinate points. When a terminal moves in and out of a particular geographic region or moves within a particular geographic region, the terminal may receive an automatic notification and an alarm. Based on a geo-fencing technology, automatic registration may be implemented when a user enters a particular region. The geo-fencing may be a basic distribution unit applied to a logistics and transportation industry. A logistics enterprise distributes a corresponding waybill to a corresponding fence distribution station according to a corresponding fence adapted to a waybill address. Different logistics enterprises may adopt different fence systems, that is, different fences have different fence boundaries and fence identifiers. The geo-fencing may be alternatively a basic no-fly unit or the like that is applied to limit the entry of an unmanned aerial vehicle into a high-risk region.

In some embodiments, a computer device receives an address text reported by a terminal. The address text may be an address text reported by the terminal, or the address text may be an address text on which geographic coordinates extraction needs to be performed. For example, when a user performs navigation by using a map application, according to an address text inputted by the user, geographic coordinates of the address text may be obtained, to relatively accurately instruct the user to drive to a destination. Alternatively, the address text may be an address text on which coordinate error correction needs to be performed. For example, in logistics transportation, when a deliveryman finds that a waybill automatically sorted based on geographic coordinates obtained based on a geocoding service does not actually belong to a distribution range of a current fence distribution station, indicating that the geographic coordinates corresponding to the waybill address are not accurate enough, error correction needs to be performed on the geographic coordinates, and the deliveryman may report the error coordinates by using the terminal. Reported information includes an address text corresponding to the waybill address in which a sorting error occurs and a fence identifier of a correct fence distribution station to which the waybill address is actually to be sorted.

In an embodiment, the address text may be alternatively obtained from another computer device in a communication manner such as a universal serial bus (USB) interface connection or a network connection.

S204. Perform semantic extension on the address text to obtain a plurality of extended addresses.

The semantic extension refers to a process of predicting, by deleting, extending, or replacing an address element of an address text, other more address texts that can indicate address location information similar to that of the address text. The address element refers to a text fragment in the address text for describing an address location. The extended address refers to a new address text obtained through the semantic extension. The "extended address" mentioned herein and below includes the "address text".

In some embodiments, the computer device splits the address text into a plurality of text words and screens the text texts to obtain a text word belonging to the address element. The text word belonging to the address element refers to valid information that can describe an address location. For example, the "Street D" in the address text is a text word belonging to the address element, and the "Please directly distribute it to the upstairs" in the address text is a text word that does not belong to the address element. The computer device performs role annotation on each address element, that is, determines an address role of each address element. The address role refers to a semantic category of a corresponding address element in the address text. The address role may include a city, a county, a town street, a road, a village, a POI, a building number, a door number, and the like.

The deleting an address element refers to deleting address elements corresponding to one or more address roles in the address text. The computer device records a plurality of address roles and information about whether each address role is deletable during semantic extension. The computer device deletes corresponding address elements in the address text according to one or more deletable address roles. For example, if the "Village" belongs to a deletable address role, the address text in the foregoing example may be deleted into "Store E, Street D, District B, City A".

The extending an address element refers to inserting address elements corresponding to one or more address roles into the address text. In some embodiments, the address role corresponding to the inserted address element may be a missing address role in the address text. For example, the "Road" address role is missing in the address text in the foregoing example, and an address element "Road F" of the "Road" may be inserted in a corresponding location of the address text, to obtain an extended address "Store E, Road F, Street D, Village C, District B, City A".

The replacing an address element refers to replacing an address element corresponding to an address role in the address text with another synonymous address element or alias address element of the same address role. For example, the "Street D" in the address text in the foregoing example may be replaced by a synonymous address element "Avenue D", and the "Store E" may be replaced by a synonymous address element "Shop E", to obtain an extended address "Store E, Street D, Village C, District B, City A", "Shop E, Avenue D, Village C, District B, City A", and "Shop E, Street D, Village C, District B, City A".

S206. Convert each of the extended addresses into corresponding geographic coordinates.

The geographic coordinates refer to spherical coordinates (lng, lat) representing a location of a ground point by using a longitude lng and a latitude lat. The geographic coordinates may be long latitude of astronomy, geodetic longitude and latitude, or geocentric longitude and latitude.

In some embodiments, the computer device converts each of the extended addresses into corresponding geographic coordinates based on a geocoding service. The geographic coordinates obtained by using the geocoding service are in one-to-one correspondence with the extended addresses.

In an embodiment, the computer device may alternatively search for geographic coordinates corresponding to each of extended addresses based on a coordinate retrieval service. The geographic coordinates obtained by using the coordinate retrieval service and the extended addresses may be in a one-to-one relationship or may be in a many-to-one relationship. In other words, one or more geographic coordinates corresponding to each extended address may be obtained based on the coordinate retrieval service. Different coordinate retrieval service providers provide different coordinate retrieval manners. For example, a coordinate retrieval operator 1, a coordinate retrieval operator 2, and the like provide different coordinate retrieval manners.

S208. Recognize a key address element in the extended addresses.

The key address element refers to an address element that can cause address location information described by the address text to be in a converged state. The converged state refers to a state in which a possible region may be accurately positioned from a large quantity of dispersed possible regions. In some embodiments, the key address element may be a POI prefix of one or more POIs that can narrow down a large quantity of POIs of geographic location to a limited number. For example, in the address text in the foregoing example, there are a plurality of POIs "Store E" in the City A, but there is only a small quantity of POIs "Store E, Street D" or POIs "Store E, Village C", indicating that the street D or the village C is a key address element that can help geographical location information described in the address text converge.

That is, the recognizing a key address element in the extended addresses in S208 refers to: recognizing a key address element of each of the plurality of extended addresses obtained in S204. Therefore, the obtained key address element includes the key address element recognized in each extended address.

S210. Screen corresponding geographic coordinates depending on whether an extended address corresponding to the geographic coordinates includes a key address element and whether the geographic coordinates are located in a target fence corresponding to the fence identifier, to obtain one or more screened geographic coordinates.

That is, the geographic coordinates are screened depending on whether an extended address corresponding to a geographic coordinates includes the recognized key address element and whether the geographic coordinate is located in a target fence corresponding to the fence identifier.

In some embodiments, there may be a plurality of finally recognized key address elements. The computer device traverses the plurality of extended addresses, and recognizes whether a current extended address includes all key address elements, all the key address elements being all key address elements obtained through the recognition. If the current extended address includes all the key address elements, the computer device retains geographic coordinates corresponding to the current extended address; and if the current extended address does not include all the key address elements, the geographic coordinates corresponding to the current extended address are deleted.

In addition, for each of the geographic coordinates obtained through the screening, the computer device recognizes whether the geographic coordinates are in a target fence based on a ray method. The target fence is displayed in the form of an irregular polygon in a digital map. Each extended address may be displayed in the form of a coordinate point according to a location of corresponding geographic coordinates in the digital map. The ray method refers to drawing a ray along an X axis from a coordinate point corresponding to the current extended address, sequentially determining an intersection of the ray and each edge of the target fence, and counting a quantity of intersections. If the quantity of intersections is an odd number, it indicates that the coordinate point corresponding to the extended address is inside the target fence; and if the quantity of intersections is an even number, it indicates that the coordinate point corresponding to the extended address is outside the target fence.

In an embodiment, when there is a relatively large quantity of edges of the polygon corresponding to the target fence, to reduce the calculation complexity, the computer device may recognize whether geographic coordinates corresponding to an extended address are in the target fence according to an R-tree indexing method. The R-tree indexing method refers to approximately replacing the polygon with a minimum bounding rectangle, constructing an R index tree, and determining, according to the R index tree, whether a coordinate point corresponding to an extended address is covered by the bounding rectangle. If the coordinate point is covered by the bounding rectangle, it indicates that the coordinate point corresponding to the extended address is inside the target fence; otherwise, it indicates that the coordinate point corresponding to the extended address is outside the target fence.

The computer device performs, depending on whether coordinate points corresponding to the extended addresses fall within the target fence, secondary screening on each extended address, and only retains geographic coordinates including all the key address elements and falling within the target fence, the geographic coordinates including all the key address elements referring to that the extended addresses corresponding to the geographic coordinates include all the key address elements.

S212. Determine, according to a clustering feature of the geographic coordinates, geographic coordinates obtained through the screening as processed coordinates. That is, the geographic coordinates obtained through the screening are determined as processed coordinates according to a clustering feature of each of the geographic coordinates obtained through the screening.

In some embodiments, the determining, according to a clustering feature of each of the screened geographic coordinates, one of the screened geographic coordinates as a processed coordinate may include: determining, according to the clustering feature of the geographic coordinates, geographic coordinates obtained through the screening as corrected coordinates.

The clustering feature is a feature such as a Gaussian density distribution value representing a clustering feature of geographic coordinates. A larger Gaussian density distribution value indicates more aggregation of corresponding geographic coordinates, and the geographic coordinates may be used as a cluster center point. The cluster center point refers to a geographic coordinate point with a highest aggregation in a plurality of geographic coordinate points.

In some embodiments, if there are a plurality of geographic coordinates obtained through the secondary screening, the computer device calculates a clustering feature of each of the geographic coordinates by using a clustering algorithm, to determine a cluster center point in the plurality of geographic coordinates. The clustering algorithm is, for example, a division-based clustering method (k-means), a fuzzy clustering algorithm (fuzzycluster), a density-based spatial clustering of application with noise (DBSCAN), or a clustering algorithm by fast search and find of density peaks.

The computer device further screens, according to the clustering feature, the plurality of geographic coordinates obtained through the screening, to obtain geographic coordinates with a highest aggregation and filters noise data, so that the geographic coordinates obtained through the screening are valid, thereby improving the accuracy of a coordinate data processing result.

According to the geo-fence based coordinate data processing method, by performing semantic extension on an obtained address text, a plurality of extended addresses may be obtained, and the obtained extended addresses may be respectively converted into corresponding geographic coordinates, thereby obtaining a plurality of possible geographic coordinates. Compared with the related art in which unique geographic coordinates are obtained through geocoding only based on an address text, impact of irregular description of the address text or single information on the accuracy of the geographic coordinates obtained through the conversion may be reduced, and more possibilities are covered from a coordinate source level. In the plurality of geographic coordinates obtained through the extension, region constraint is performed based on a target fence, the geographic coordinates are screened depending on whether the recognized key address element are included, and some invalid geographic coordinates may be filtered. Final geographic coordinates are determined based on a clustering feature in the geographic coordinates obtained through the screening and filtering, and the accuracy of processed coordinates can be improved based on the multi-level screening and a high aggregation requirement. In addition, the corresponding processed coordinates may be quickly fed back by only providing the address text, the costs of manually obtaining the processed coordinates are reduced, and the timeliness of processing a coordinate data processing task can be improved.

In an embodiment, the performing semantic extension on the address text to obtain a plurality of extended addresses includes: obtaining a standard address associated with a POI text included in the address text; determining an address role of each address element in the standard address and an address role of each address element in the address text; and filling the address text with the address element of an address role that appears in the standard address but does not appear in the address text, to obtain an extended address.

That is, the standard address associated with the POI text included in the address text is obtained; the address role of each address element in the standard address and the address role of each address element in the address text are determined, and the address role that appears in the standard address but does not appear in the address text is determined; and the address text is filled with the address element corresponding to the address role, to obtain the extended address.

In addition to obtaining the geographic coordinates corresponding to the address text, the computer device may further obtain POI information of a POI entity in the address text based on the geocoding service. The POI information includes geographic coordinates (recorded as POI coordinates) of the POI entity and a standard address. A storage apparatus is deployed on the computer device, and standard addresses of a plurality of POI entities are stored in the storage apparatus. The storage apparatus may be a memory in the terminal, or may be a database deployed in the server, or the like.

The standard address refers to a normalization address used for describing a POI geographic location. Different users may describe the same POI by using different address texts, but a standard address of the POI is uniquely determined. The standard address and the address text may be understood as different descriptions of the same POI geographic location. An address text adopted by the user may be exactly a standard address of a corresponding POI. Corresponding standard addresses may not be stored in the storage apparatus for some POIs.

In some embodiments, the computer device queries, based on the geocoding service, whether the standard address corresponding to the POI entity included in the address text is stored. If there is the standard address corresponding to the POI entity, the computer device splits the standard address into a plurality of address elements in the foregoing manner, determines an address role of each address element, and compares whether an extra address role (recorded as an extendable role) exists in the standard address relative to the address text. The computer device extracts an address element corresponding to the extendable role from the standard address, and inserts the extracted address element into the address text, to obtain an extended address. An insertion location of the address element may be determined according to an arrangement order of the address roles in the standard address, to ensure that the address text to which the address element is inserted has the same quantity and order of address roles as the standard address. For example, if a standard address of the POI entity "Store E" in the foregoing example includes an address role "Road", an address element corresponding to the address role is "Road F", and the address role "Road" is missing in the address text, the address element "Road F" of the "Road" may be inserted in a corresponding location of the address text, to obtain an extended address "Store E, Road F, Street D, Village C, District B, City A".

If there is no standard address corresponding to the POI entity, the address text is extended in another manner.

In addition, the computer device may further compare whether a condition in which the same address role is described by using different address elements exists in the standard address relative to the address text. If there is the condition in which the same address role is described by using different address elements, the computer device combines, in an enumeration manner, different address elements for describing different address roles, to obtain one or more extended addresses.

In one embodiment, address element extension is performed on the address text according to the standard address of the POI obtained through geocoding, so that the obtained extended address may describe geographic location information of the POI from more dimensions than the address text, thereby improving the reliability of a processing result of subsequent coordinate processing based on the extended address.

In an embodiment, the performing semantic extension on the address text to obtain a plurality of extended addresses includes: filtering invalid text words in the address text, to obtain a valid address; determining an address role of each address element in the address text; recognizing whether the address text includes all address roles in a preset role annotation sequence; recombining, when the address text includes all the address roles in the role annotation sequence, address elements of the address text according to address roles appearing in the corresponding role annotation sequence, to obtain combined addresses; combining the address elements in the address text when the address text does not include all the address roles in the role annotation sequence, to obtain enumerated addresses; and deduplicating the valid address, the combined addresses, and the enumerated addresses, to obtain the extended addresses. Here, combining or freely combing the address elements may refer to obtaining one or more possible combinations of address elements in the address text without repetition, each combination being used as one enumerated address. For example, free combination of 3 address elements can result in at most 4 enumerated addresses ($C_3^2+C_3^3$); free combination of 4 address elements can result in at most 11 enumerated addresses ($C_4^2+C_4^3+C_4^4$).

That is, the invalid text words in the address text are filtered, to obtain the valid address, the address role of each address element in the address text is determined, it is recognized whether the address text includes all the address roles in the preset role annotation sequence, when the address text includes all the address roles in the role annotation sequence, the address elements of the address text are recombined according to the address roles appearing in the role annotation sequence, to obtain the combined addresses, and the valid address and the combined addresses are deduplicated, to obtain the plurality of extended addresses.

The address elements in the address text are combined when the address text does not include all the address roles in the role annotation sequence, to obtain the enumerated addresses, and the valid address and the enumerated addresses are deduplicated, to obtain the plurality of extended addresses.

When there are a plurality of preset role annotation sequences, that the address text includes all the address roles in the role annotation sequence refers to that the address text includes all the address roles in any role annotation sequence.

The computer device presets a plurality of address extension logic, and each extension logic has a corresponding extension logic identifier such as a number formed by a character, a digit, or the like. Extension logic is to filter invalid text words in an address text, obtained extended addresses may be recorded as valid addresses, the valid address may be recorded as "a, terminal address full match", and "a" is a corresponding extension logic identifier.

The invalid text word refers to a word in the address text that is not helpful to describing an address location. The invalid text word includes non-address description information or a repeatedly inputted text word. According to different precision requirements of geographic coordinates, the invalid text word further includes an address element of a specific address role at the tail of the address text. It is assumed that the precision of geographic coordinates is defined in one neighborhood, that is, the same address coordinates are adopted for different buildings in the same neighborhood, address elements of address roles such as a building number and a room number having smaller level than an address role "neighborhood" are all invalid text words. For example, a repeated text word "City A", non-address description information "Please deliver during work hours", and "Counter 2nd Floor" at the tail in an address text "Counter, 2nd Floor, Store E, Street D, Village C, District B, City A, City A (Please deliver during work hours)" are respectively invalid text words.

Another extension logic is to combine address roles in an address text based on a preset role annotation sequence, and obtained extended addresses may be recorded as combined addresses. The role annotation sequence is a text sequence including a plurality of address roles arranged in an order. A data format of the role annotation sequence may be an array, or a character string formed by splicing a plurality of address roles by using a preset character, or the like, which is not limited. For example, a role annotation sequence may be [Building number, POI, Road, Town street, County, City] or "Building number+POI+Road+Town street+County+City". The computer device pre-stores a plurality of role annotation sequences. There may be a plurality of extension logic according to different role annotation sequences. For example, the combined addresses may include "b, Building Number+POI+Road+Township Street+County+City", "c, POI+Village+Town Street+County+City", "d, POI+Road+Town Street+County+City", "e, House Number+Road+Township Street+County+City", "f, POI+Road+County+City", "g, House Number+Road+County+City", "h, Village+Town Street+County+City" and the like.

Still another extension logic is to freely combine address elements in an address text in an enumeration manner, and obtained extended addresses may be recorded as enumerated addresses. The enumerated address may be recorded as "i, Another Element Combined Sample+City".

In some embodiments, the computer device performs semantic extension on the address text respectively based on each extension logic. The valid address, the combined addresses, or the enumerated addresses obtained based on different extension logic may be repeated, and the computer device deduplicates a plurality of extended addresses, to obtain an extended address set, which is recorded as Eaddr<address_pattern, pattern_type>. The extended address set includes one or more extended addresses. The address_pattern is an extended address text, that is, an extended address; and the pattern_type is an extended logic identifier, that is, the a-i. If all the address roles in any role annotation sequences are not covered in the address text, that is, when extension cannot be performed based on the extension logic b-h, the extension may be performed according to the extension logic i.

In an embodiment, the computer device may extend an address text based on a standard address, to obtain an extended address text, and then perform semantic extension on the extended address text respectively again by using each extension logic.

For example, for the address text "Counter 2nd Floor Store E Street D Village C District B City A (Please deliver during work hours)", an address text that is extended based on an annotated address corresponding to the "Store E" may be the "Counter 2nd Floor Store E Street D Village C District B City A City A (Please deliver during work hours)". An extended address set corresponding to the extended address text may be Eaddr<Store E, Road F, Street D, Village C, District B, City A, a; 2nd Floor, Store E, Street D, District B, City A, b; Store E, Village C, Street D, District B, City A, c; Store E, Road F, Street D, District B, City A, d; Store E, Road F, District B, City A, f; Village C, Street D, District B, City A, h>. It is easy to understand that if extension fails by using extension logic, an address extension result based on the extension logic may be no longer recorded.

In one embodiment, the address text is extended from a plurality of dimensions, a plurality of semantics actually and possibly described by the address text may be predicted, and the sources of coordinates can be greatly enriched. Compared with a manner in which unique geographic coordinates are obtained through geocoding only based on the address text, the impact of irregular description of the address text or single information on the accuracy of the geographic coordinates obtained through conversion may be reduced.

In an embodiment, before the recognizing one or more key address elements in the extended addresses, the method further includes: expanding a fence boundary of a fence corresponding to the fence identifier by a preset distance; determining whether geographic coordinates of the extended addresses are located in the expanded fence; and filtering the extended addresses when a geographic coordinate of an extended address is not located in the expanded fence. That is, if the geographic coordinate of the extended address is not within the expanded fence, such extended address is removed.

That is, the recognizing a key address element in the plurality of extended addresses includes: expanding a fence boundary of a fence corresponding to the fence identifier by a preset distance; determining whether geographic coordinates corresponding to the plurality of extended addresses are located in the expanded fence; screening, when any geographic coordinates are not located in the expanded fence, the extended address corresponding to the geographic coordinates; and recognizing the key address element in the extended address obtained through the screening.

The computer device respectively converts each extended address in the extended address set Eaddr into corresponding geographic coordinates by using the geocoding service, to obtain an address coordinate set, which is recorded as Saddr<point, address_pattern, pattern_type>. The point refers to geographic coordinates corresponding to a corresponding extended address.

In another embodiment, the computer device may search the extended address set Eaddr for geographic coordinates corresponding to each extended address by using the coordinate retrieval service. Different coordinate retrieval service providers provide different coordinate retrieval manners. Because different geographic coordinates of the same extended address may be obtained based on different coordinate retrieval services, an address coordinate set is obtained, which may be recorded as Saddr<point, source, address_pattern, pattern_type>. The source refers to a coordinate retrieval manner, the point refers to geographic coordinates obtained by retrieving a corresponding extended address in a corresponding coordinate retrieval manner.

The precisions of boundary coordinates of different fence systems are different. To reduce the impact of the fence boundary coordinate error on the accuracy of a result of screening the geographic coordinates, the computer device may appropriately expand the fence boundary of the fence, for example, uniformly expand an outer diameter by a preset distance. The preset distance may be a spatial size length that is freely defined according to requirements, for example, 1 kilometer (km).

In some embodiments, the computer device determines whether each point in the Saddr is located in the expanded fence. In other words, the computer device selects a point that falls within a fence contour and a point that does not fall within the fence contour but a distance between the point and a nearest boundary of the fence is less than the preset distance, and marks whether each point in the Saddr is in a fence constraint, to obtain a target coordinate set, which is recorded as S2addr<point, source, address_pattern, pattern_type, is_in_polygon>. is_in_polygon=1 represents that a corresponding point is within the fence, and is_in_polygon=0 represents that a corresponding point is not within the fence. All geographic coordinates in the S2addr set meet a fence specification requirement.

In one embodiment, fence constraint is performed on the extended addresses before the key address element(s) in the extended addresses are recognized, the extended addresses used for recognizing the key address element(s) may be screened, and only geographic coordinates in the fence participate in the recognition of the key address element(s), to improve the accuracy of a result of recognizing the key address element(s). In addition, because the key address element recognition of the extended address outside the fence is reduced, an amount of calculation in a process of recognizing the key address element(s) can be reduced, and the efficiency of recognizing the key address element(s) is improved, thereby improving the coordinate processing efficiency. The fence is expanded so that filtering of some geographic coordinates that fall outside the fence but have meaning for the coordinate processing may be reduced, thereby weakening the impact of an error of the fence boundary coordinates on the accuracy of a result of screening the geographic coordinates.

In an embodiment, the recognizing key address element(s) in the extended addresses includes: constructing a path graph corresponding to the address text by using each address element included in the extended addresses as a node and using a neighborhood relationship between different address elements in a corresponding extended address as a directed edge; calculating a node value of each node and a directed edge value of each directed edge in the path graph; determining an optimal path according to the node value and the directed edge value; and determining each address element included in the optimal path as the key address element.

That is, the recognizing key address element(s) in the plurality of extended addresses includes: constructing a path graph corresponding to the address text by using each address element included in the plurality of extended addresses as a node and using a neighborhood relationship between different address elements in a same extended address as a directed edge; calculating a node value of each node in the path graph and a directed edge value of a directed edge between any two neighboring nodes; determining a target path according to each node value and each directed edge value; and determining each address element included in the target path as the key address element. The target path is the optimal path.

The path graph refers to a directed graph constructed by using each address element in the extended addresses as a node and using a neighborhood relationship between different address elements in the same extended address as a directed edge. The extended address used for constructing the path graph may be an extended address reserved after screening is performed based on the expanded fence. Only two neighboring address elements in the extended address are connected by a directed edge, and the directed edge points from a previous address element to a subsequent address element.

Figure 3:
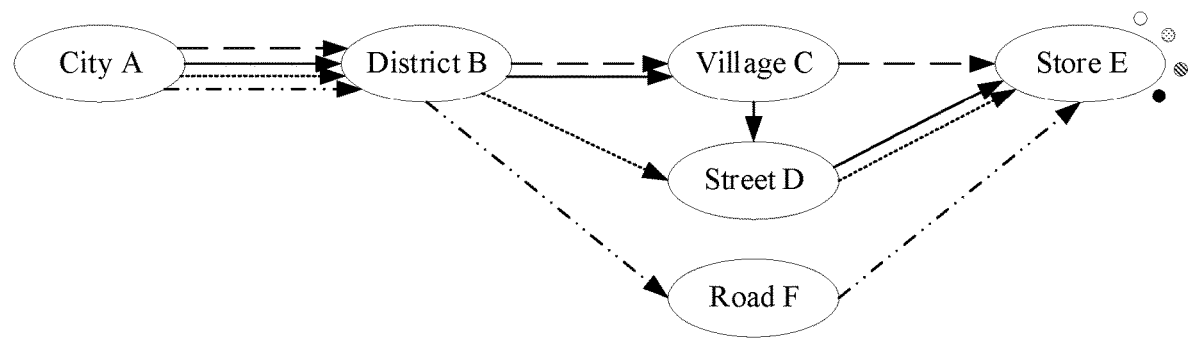
FIG. 3 is a schematic diagram of a path graph corresponding to an address text according to an embodiment.

FIG. 3 is a schematic diagram of a path graph corresponding to an address text according to an embodiment. As shown in FIG. 3, each extended address forms a path in the path graph, so that there may be a plurality of directed edges between two connected nodes. A node corresponding to a POI may be associated with geographic coordinates corresponding to each extended address, and the geographic coordinates may be displayed near a POI node in a manner of a coordinate value, a marking point, or the like. To distinguish paths corresponding to different extended addresses, directed edges corresponding to different extended addresses may be displayed in the form of different colors or different degrees of thicknesses.

Figure 4:
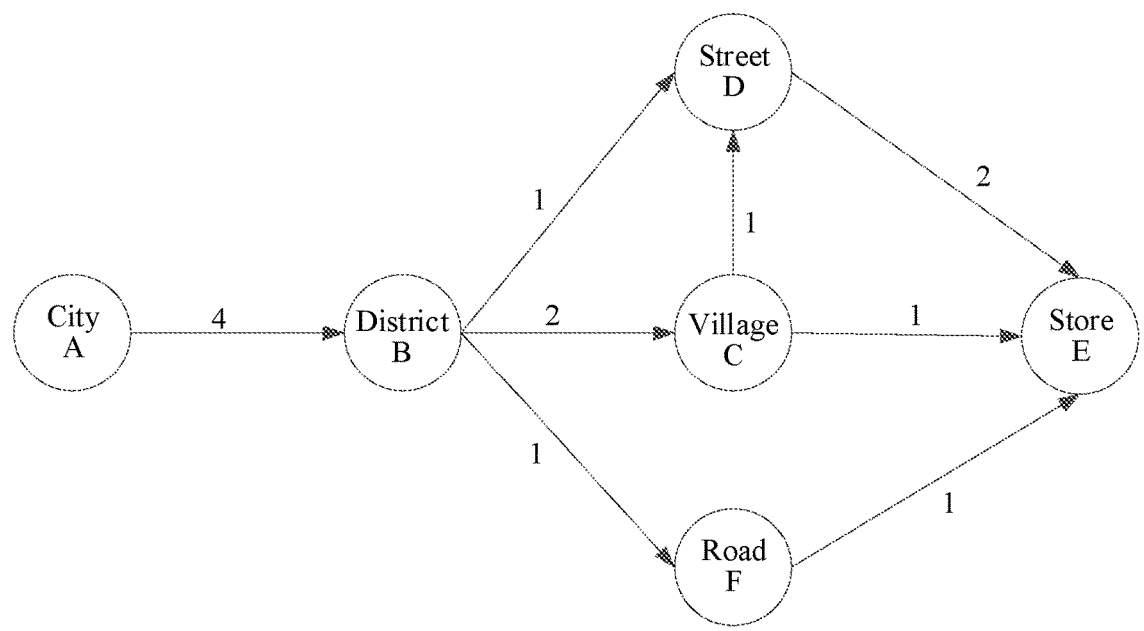
FIG. 4 is a schematic diagram of a path graph corresponding to an address text according to another embodiment.

FIG. 4 is a schematic diagram of a path graph corresponding to an address text according to another embodiment. As shown in FIG. 4, if there are a plurality of directed edges between two connected nodes, the plurality of directed edges between the two connected nodes are combined into one directed edge for displaying, and a quantity of corresponding combined directed edges is displayed near the combined directed edge in an association manner.

The node value refers to a value that can reflect the significance of a corresponding node for accurately determining an address location of a corresponding POI, and may be represented by a proportion of a quantity of paths including the node to a total quantity of paths. The directed edge value refers to a value that can reflect the significance of a corresponding directed edge for accurately determining an address location of a corresponding POI, and may be represented by a proportion of a quantity of directed edges in which a current node is connected to another node to a quantity of directed edges pointed from the current node. The optimal path is one path obtained through the screening from a plurality of paths involved in the path graph according to the node value and the directed edge value.

In some embodiments, the computer device calculates a node value of each node and a directed edge value of each directed edge in the path graph, and screens the path graph to obtain a path including a target node and a target directed edge as an optimal path, the target node having a largest node value, the target directed edge having a largest directed edge value. The optimal path may be recorded as NodeSquence<elem_name>, which includes a plurality of nodes. The computer device determines an address element elem_name corresponding to each node included in the optimal path as a key address element. The computer device screens the address coordinate set Saddr to obtain extended addresses including all key address element(s), to obtain a key address coordinate set Maddr<point, source, address_pattern, pattern_type, is_in_polygon>. In another embodiment, the computer device may screen the target coordinate set to obtain extended addresses including all key address element(s), to obtain a key address coordinate set Maddr.

In one embodiment, the optimal path is determined by measuring the value of each node and the value of each directed edge, so that the determined optimal path is a path with a largest value, thereby ensuring the accuracy of a result of recognizing the key address element(s).

In an embodiment, an extended address of which corresponding geographic coordinates are located in a fence corresponding to the fence identifier is recorded as an intra-fence path; and the calculating a node value of each node and a directed edge value of each directed edge in the path graph includes: traversing each node and each directed edge in the path graph; calculating, according to a proportion of an intra-fence path including a current node to all intra-fence paths, a node value of the current node; calculating an in-degree of the current node according to a quantity of directed edges pointing to the current node; calculating an out-degree of the current node according to a quantity of directed edges pointed from the current node; and calculating, according to a proportion of a quantity of directed edges in which the current node is connected to another node to the out-degree of the current node, a directed edge value of a corresponding directed edge.

That is, when a geographic coordinate corresponding to any extended address is located in a fence corresponding to the fence identifier, the extended address is recorded as an intra-fence path; and the calculating a node value of each node in the path graph and a directed edge value of a directed edge between any two neighboring nodes includes: traversing each node and each directed edge in the path graph; calculating, according to a proportion of an intra-fence path including any node to all intra-fence paths, a node value of the node; calculating an out-degree of the node according to a quantity of directed edges pointed from the node; and calculating, according to a proportion of a quantity of directed edges in which the node is connected to a same node to the out-degree of the node, a directed edge value of a directed edge between the node and the same node.

The intra-fence path refers to a path corresponding to an extended address of which geographic coordinates are located in the fence corresponding to the fence identifier. It is easy to understand that if the expanded path used for constructing the path graph is an extended address reserved after screening is performed based on the expanded fence, each path in the path graph is the intra-fence path.

The node value of the node may be a ratio of a quantity of intra-fence paths including the node to a quantity of all intra-fence paths. The intra-fence path including the node refers to an intra-fence path including an address element corresponding to the node. For example, as shown in FIG. 3 or FIG. 4, the path graph has four intra-fence paths in total, which include two paths including "Village C", and a node value corresponding to a node "Village C" is $2/4=50\%$.

The in-degree of the node refers to a quantity of directed edges pointing to the node. The out-degree of the node refers to a quantity of directed edges pointed from the node. For example, as shown in FIG. 3, the path graph has four directed edges pointing to "District B" and four directed edges pointed from "District B", an in-degree of the node "Town B" is 4, and an out-degree is 4.

The directed edge value may be a ratio of a quantity of directed edges in which a current node is connected to another node to an out-degree of the current node. For ease of description, address elements corresponding to two nodes connected by a directed edge are distinguished as a preceding address element and a subsequent address element. The directed edge points from the preceding address element to the subsequent address element. For example, a preceding address element of a directed edge pointing from "Haidian" to "Village C" is "Haidian", and a subsequent address element is "Village C". Therefore, the directed edge value refers to a ratio of a quantity of directed edges pointing from a preceding address element to a subsequent address element to an out-degree of the preceding address element. For example, as shown in FIG. 3, the path graph has two directed edges pointing from "Haidian" to "Village C", and an out-degree of the preceding address element "Haidian" of the two directed edges is 4. Therefore, a directed edge value of a directed edge pointing from "Haidian" to "Village C" is $2/4=50\%$.

In some embodiments, the computer device traverses and calculates a node value of each node, to obtain a node set corresponding to the path graph. The node set records a name of an address element and a node value that correspond to each node in the path graph. The node set may be recorded as Node<elem_name, node_right_rate>, elem_name being an address element corresponding to a corresponding node, node_right_rate being a node value of the node. For example, as shown in FIG. 3 or FIG. 4, a node set corresponding to the path graph may be Node<City A, 100%; District B, 100%; Village C, 50%; Street D, 25%; Road F, 25%; Store E, 100%>.

The computer device traverses and calculates an in-degree and an out-degree of each node, to obtain an out/in-degree set corresponding to the path graph. The out/in-degree set may be recorded as Degree<elem_name, in_count, out_count>, in_count being an in-degree of a node elem_name, out_count being an out-degree of the node elem_name. For example, as shown in FIG. 3 or FIG. 4, an out/in-degree set corresponding to the path graph may be Degree<City A, 0, 4; District B, 4, 4; Village C, 2, 2; Street D, 1, 2; Road F, 1, 1; Store E, 4, 0>.

The computer device traverses and calculates a directed edge value of each directed edge, to obtain a directed edge set corresponding to the path graph. The directed edge refers to a directed edge between two neighboring nodes. The directed edge set records a name of a preceding address element, a name of a subsequent address element, and a directed edge value that correspond to each directed edge in the path graph. The directed edge set may be recorded as Edge<in_elem, out_elem, edge_right_rate>, in_elem being a name of a preceding address element, out_elem being a name of a subsequent address element, edge_right_rate being a directed edge value of a directed edge connecting the preceding address element and the subsequent address element. For example, as shown in FIG. 3 or FIG. 4, a directed edge set corresponding to the path graph may be Edge<City A, District B, 100%; District B, Village C, 50%; District B, Street D, 25%; District B, Road F, 25%; Village C, Store E, 50%; Village C, Street D, 50%; Street D, Store E, 100%; Road F, Store E, 100%>.

In one embodiment, by calculating the proportion of the quantity of paths including the node to the quantity of all paths, and by calculating the proportion of the quantity of directed edges in which the node is connected to the another node to the quantity of directed edges pointed from the node, the node values of the plurality of nodes and the directed edge values of the plurality of directed edges may be determined for the address text in a targeted manner, and the specific problem is specifically analyzed, so that the determined node values and the determined directed edge values can accurately reflect the significance of each node and each directed edge for determining the optimal path, thereby improving the accuracy of the coordinate processing.

In an embodiment, the determining an optimal path according to the node value and the directed edge value includes: determining a parent node of each node according to the node value and the directed edge value; marking a node having a zero in-degree as a head node, and marking a node having a zero out-degree as a tail node; determining the tail node as a current level node of the optimal path; and iterating a parent node of the current level node as the current level node until the head node, to obtain the optimal path including a plurality of level nodes That is, the determining a target path according to each node value and each directed edge value includes: determining a parent node of each node according to each node value and each directed edge value; calculating an in-degree of each node according to a quantity of directed edges pointing to each node; marking a node having a zero in-degree as a head node, and marking a node having a zero out-degree as a tail node; determining the tail node as a first level node of the target path; and determining a parent node of the first level node as a second level node of the target path, and determining a parent node of the second level node as a third level node of the target path until a determined level node is the head node, to obtain the target path including a plurality of level nodes.

The head node refers to a node having a zero in-degree, and the tail node refers to a node having a zero out-degree. For example, as shown in FIG. 3 or FIG. 4, "City A" in the path graph is a head node, and "Store E" is a tail node. There are typically one head node and one tail node in the path graph.

A preceding node refers to a preceding address element to which a node as a subsequent address element is connected by a directed edge. One node may have a plurality of preceding nodes. For example, as shown in FIG. 3 or FIG. 4, in the path graph, preceding nodes corresponding to "Street D" are "District B" and "Village C". A parent node of a current node is a preceding node corresponding to the current node. It is easy to understand that the head node does not have a parent node.

In some embodiments, the computer device determines a parent node of each node other than a head node in the path graph according to a Dijkstra algorithm, to obtain a parent node set. The parent node set may be recorded as NodeF (elem_name, father_elem), father_elem being a parent node of the node elem_name.

In addition, each path includes a plurality of address elements arranged in sequence. The levels of different address elements in the path may be distinguished according to the sequence, and a higher rank indicates that a corresponding level is higher. After the parent node is determined, the tail node is used as a node of the lowest level in the optimal path. The computer device performs reverse traversal on the path graph by using the tail node as a current level node, traces a parent node of the current level node, continuously traces, by using the parent node as a current level node, a parent node of the current level node until the parent node of the current level node is the head node, and forms the optimal path based on a plurality of level nodes obtained through the tracing. For example, as shown in FIG. 3 or FIG. 4, in the path graph, if a parent node corresponding to a tail node "Store E" is "Village C", a parent node of "Village C" is "District B", and a parent node of "District B" is a head node "City A", the optimal path is "Store E Village C District B City A".

In one embodiment, the parent node of each node is determined according to the value of each node and the value of each directed edge, and a path with a largest value may be determined by backward tracing of the parent node.

In an embodiment, the determining a parent node of each node according to the node value and the directed edge value includes: determining another node of which a directed edge points to a current node as a preceding node of the current node; and calculating, when there are a plurality of preceding nodes, a link value of each preceding node relative to the current node according to node values of the preceding nodes and a directed edge value of a directed edge used for connecting the current node and a preceding node, and determining a preceding node with a largest link value as a parent node of the current node.

That is, the determining a parent node of each node according to each node value and each directed edge value includes: determining another node of which a directed edge points to a current node as a preceding node of the current node; and calculating, when there are a plurality of preceding nodes, a link value of each preceding node relative to the current node according to a node value of each preceding node and a directed edge value of a directed edge used for connecting the current node and a corresponding preceding node, and determining a preceding node with a largest link value as a parent node of the current node.

The link value is a value that can reflect the significance of a local path formed by connecting directed edges for determining the optimal path, and may be represented by a product of a node value node_right_rate of a preceding node and a directed edge value edge_right_rate of a directed edge used for connecting a current node and the preceding node. The link value is recorded as trans_right_rate.

In some embodiments, the computer device calculates a link value of each preceding node relative to a current node, and determines a preceding node with a largest link value as a parent node of the current node. If there are a plurality of preceding nodes with the largest link value, one preceding node is selected as a parent node according to a preset rule. For example, a preceding node with a largest node value is selected as a parent node, a preceding node with a largest directed edge value is selected as a parent node, or a preceding node is randomly selected as a parent node. For example, a link value trans_right_rate of a preceding node "District B" relative to "Street D" is 100%*25%=25%, and a link value trans_right_rate of a preceding node "Village C" relative to "Street D" is 50%*50%=25%. Therefore, the "Village C" may be randomly selected as a parent node.

In one embodiment, when one node has a plurality of preceding nodes, a link value of each preceding node connected to a current node is measured according to a value of the node and a value of a directed edge, and a preceding node with a largest link value is selected as a parent node, so that a plurality of local paths with large values may be determined, and then the optimal path with the largest value may be determined according to the values of the local paths.

In an embodiment, the geo-fence based coordinate data processing method further includes: recognizing a POI text in the address text; combining, when there are a plurality of POI texts, the plurality of POI texts, to obtain a combined POI text; querying an alias POI text associated with the POI text; performing synonymous replacement on a text word included in the POI text, to obtain a synonymous POI text; and determining the combined POI text, the alias POI text, and the synonymous POI text as extended POI texts corresponding to the POI text.

That is, the POI text in the address text is recognized; and at least one of the combined POI text, the alias POI text, or the synonymous POI text is determined as the extended POI text corresponding to the POI text. When there are a plurality of POI texts, the combined POI text is obtained by combining the plurality POI texts, the alias POI text is obtained by querying an alias POI text associated with the POI text, and the synonymous POI text is obtained by performing synonymous replacement on the text word included in the POI text.

The POI text refers to a POI entity in the address text. There may be a plurality of POI texts in the same address text. For example, there are two POI texts "Building H" and "Store I" in an address text "Opposite Store I, Building H, No. 66, North Fourth Ring, District B, City A".

An alias POI is another name of the same POI based on different descriptions of the POI text, and may be an official legal normalized name of the POI, or a name other than the normalized name. The computer device further stores different names of a plurality of POI entities in the storage apparatus. For example, an alias POI corresponding to the POI text "Building H" may be "Mall J", "Mansion K", or the like.

A synonymous POI is a new POI text obtained by performing synonymous replacement on one or more finer granularity words in the POI text. For example, a finer granularity word corresponding to a POI text "Star Small School" includes two elements of "Star" and "Small School". "Small School" has synonyms "School" and "Primary School", so that synonymous POIs "Star Primary School" and "Star School" may be obtained through the extending.

In some embodiments, the computer device performs semantic extension on a POI text from a plurality of dimensions. If there are a plurality of POI texts in the address text, the computer device combines the POI texts in a continuous bigram manner, that is, combines two neighboring POI texts according to an order in which the POI texts appear in the address text, to obtain a combined POI. For example, if three POI texts A, B, and C appear in an address text in sequence, AB obtained by combining A and B and BC obtained by combining B and C are respectively used as a combined POI text. The computer device queries the storage apparatus for another name corresponding to the POI text, and uses the queried another name as an alias POI text. The computer device splits the POI text into a plurality of words with finer granularity, performs synonymous replacement on one or more words, and combines the replaced words, to obtain one or more synonymous POI texts.

In addition, the computer device determines the combined POI text, the alias POI text, and the synonymous POI text as extended POI texts corresponding to the POI text, and constructs a POI entity set based on the POI text and the extended POI text. The POI entity set may be recorded to as Epoi<input_poi_list>, input_poi_list being a list of POI entities generated by the address text and the combined POI text, the alias POI text, and the synonymous POI text that are obtained through the extending.

In one embodiment, the POI text is extended from a plurality of dimensions, a plurality of POIs that is actually and possibly intended to positioned in the address text may be predicted, and a problem of irregular description of the POI text or single information may be overcome. Synonymous extension is performed while combined extension and alias extension are performed, omission of predicting a possible POI due to the word segmentation error of the address text may be avoided, and a description coverage of the POI is improved, thereby improving the accuracy of subsequent coordinate processing based on an extended POI text.

In an embodiment, the geo-fence based coordinate data processing method further includes: searching for an associated address corresponding to each extended POI text and geographic coordinates; and screening corresponding geographic coordinates depending on whether an associated address corresponding to each of geographic coordinates includes a key address element and whether the geographic coordinates are located in the target fence corresponding to the fence identifier.

That is, an associated address corresponding to each extended POI text and geographic coordinates corresponding to each associated address are searched for; and the geographic coordinates are screened depending on whether an associated address corresponding to any of geographic coordinates corresponding to each associated address includes a key address element and whether the geographic coordinates are located in the target fence corresponding to the fence identifier.

The associated address refers to an address text that is related to an inputted extended POI and returned based on a coordinate retrieval service. The coordinate retrieval service is used for returning POI information conforming to position and name information according to inputted geographic location information constrained to a dimension such as a fixed county. A case in which no result is retrieved also needs to be recorded. In this case, a point in an S set is empty. An extended POI may correspond to a plurality of associated addresses. Each associated address has geographic coordinates. The associated address includes a plurality of address elements, and one or more address elements are associated POIs that are the same or similar to the inputted extended POIs.

In another embodiment, the coordinate retrieval service ranks retrieval results obtained through the retrieval according to a matching degree with an inputted retrieval condition. To improve the efficiency of coordinate processing of the computer device based on the associated address, when there is a relatively large quantity of associated addresses obtained through the searching, only a preset quantity of associated addresses that rank in the top may be selected, for example, first 10 associated addresses are selected to participate in subsequent coordinate processing.

In some embodiments, the computer device uses each extended POI input_poi as an input, and searches for a retrieval result corresponding to each input_poi based on the coordinate retrieval service. The retrieval result includes an associated address output_poi corresponding to the extended POI input_poi and geographic coordinates point corresponding to each associated address. The extended POI and the corresponding retrieval result may form a POI coordinate set Spoi<point, input_poi, output_poi>.

In addition, the computer device screens output_poi depending on whether each associated address output_poi in the Spoi includes all key address element(s), to obtain a key POI set Mpoi<point, input_poi, output_poi>. The computer device performs fence constraint on each point of the Mpoi based on a fence corresponding to the fence identifier, that is, selects points in the Mpoi that are located in the fence corresponding to the fence identifier, to obtain a valid POI set Rpoi<point, input_poi, output_poi>.

In another embodiment, the computer device performs fence constraint again on each point in the key address coordinate set Maddr obtained by screening and recognizing the key address element(s) based on the optimal path, that is, filters each point in the Maddr that is not in the fence corresponding to the fence identifier, to obtain a valid address coordinate set Raddr<point, source, address_pattern, pattern_type>. In one embodiment, two times of fence constraint are performed on the geographic coordinates point corresponding to the extended address, one time of fence constraint is performed on points in the Saddr based on the expanded fence, to obtain the S2addr; and after coordinate screening is performed on points in the Saddr or the S2addr depending on whether the key address element(s) are included to obtain the Maddr, the other time of fence constraint is performed on points in the Maddr based on an unexpanded fence, to obtain the Raddr.

In one embodiment, the extended POIs used for coordinate processing are screened according to the fence constraint and presence or absence of the key address element(s), only the extended POIs meeting a screening condition can participate in coordinate processing, which not only helps to improve the accuracy of the processing result, but also improves the efficiency of coordinate processing because a data volume of the extended POIs participating in coordinate processing is accurately limited.

In an embodiment, the determining, according to a clustering feature of the geographic coordinates, geographic coordinates obtained through the screening as processed coordinates includes: calculating, when there is no extended POI that meets a screening condition, a clustering density and a clustering distance of geographic coordinates corresponding to each extended address obtained through the screening; determining a target function for maximizing the clustering densities and the clustering distances that correspond to the geographic coordinates; and determining, by performing screening, geographic coordinates with a largest value of a corresponding target function obtained through the screening as the processed coordinates.

That is, when the geographic coordinates corresponding to each associated address are screened out, a clustering density and a clustering distance of geographic coordinates corresponding to each extended address obtained through the screening are calculated; a target function for maximizing the clustering densities and the clustering distances of the geographic coordinates is determined; and a value of the target function of the geographic coordinates corresponding to each extended address obtained through the screening is obtained, and geographic coordinates with a largest value of the target function are determined as the processed coordinates.

If the geo-fence based coordinate data processing method is a method for extracting geographic coordinates of an address text based on a geo-fence address, the processed coordinates are geographic coordinates obtained after performing coordinate extraction on the address text; and if the geo-fence based coordinate data processing method is a method for performing error correction on an address text based on a geo-fence address, the processed coordinates are corrected geographic coordinates corresponding to the address text. In some embodiments, the obtaining a value of the target function of the geographic coordinates corresponding to each extended address obtained through the screening, and determining geographic coordinates with a largest value of the target function as the processed coordinates may include: obtaining the value of the target function of the geographic coordinates corresponding to each extended address obtained through the screening, and determining the geographic coordinates with the largest value of the target function as corrected coordinates.

The screening condition of the extended POI includes that the associated address corresponding to the extended POI includes all key address element(s), and the geographic coordinates corresponding to the associated address are located in the target fence corresponding to the fence identifier. The clustering density is a local density of the geographic coordinates. A higher local density of the geographic coordinates indicates more coordinate points around a coordinate point corresponding to the geographic coordinates. The clustering distance refers to a distance between a coordinate point corresponding to geographic coordinates and the closest coordinate point with a higher clustering density. A greater clustering distance indicates a greater "distance" between the geographic coordinates and another geographic coordinates with a higher clustering density.

In an embodiment, points in the Rpoi and the Raddr form a geographic coordinate set Rpoint={point 1, point 2, . . . , and point N}, and $\rho_i$ and $\delta_i$ may be defined for any geographic coordinates point i ($1 \le i \le N$) in the geographic coordinate set Rpoint. The clustering density $\rho_i$ includes two calculation methods of Cut-off kernel and Gaussian kernel. For the calculation method of the Cut-off kernel:

$$\rho_i = \sum_{j \in R_{point}\setminus\{i\}} \chi(d_{ij} - d_c)$$

where a function is $$\chi(x) = \begin{cases} 1, & x < 0 \\ 0, & x \ge 0 \end{cases},$$

a parameter $d_{ij}$=dist (point i, point j) represents a distance between geographic coordinates point i and geographic coordinates point j, and a parameter dc>0 is a cut-off distance, which may be preset. As can be seen from the above calculation formula, $\rho_i$ represents a quantity of geographic coordinates point of which a distance to the point i is less than $d_c$ in the Rpoint.

For the calculation method of the aussian kernel:

$$\rho_i = \sum_{j \in R_{point}\setminus\{i\}} e^{-\left(\frac{d_{ij}}{d_c}\right)^2}$$

It is assumed that $\{q_i\}_{i=1}^N$ represents a subscript when $\{\rho_i\}_{i=1}^N$ is sorted in descending order, that is, $\{\rho_i\}_{i=1}^N$ meets $\rho_{q_1} \ge \rho_{q_2} \ge \ldots \ge \rho_{q_N}$, the clustering distance may be defined as:

$$\delta_{q_i} = \begin{cases} \min_{q_j, j<i} \{d_{q_i q_j}\}, & i \geq 2 \\ \min_{j \geq 2} \{\delta_{q_j}\}, & i = 1 \end{cases}$$

To this end, a corresponding clustering density $\rho_i$ and a corresponding clustering distance $\delta_i$ may be calculated for each of geographic coordinates points in the Ppoint.

In some embodiments, the computer device may preset a target function for maximizing clustering densities and clustering distances that correspond to geographic coordinates, for example, y=p*6. The computer device may calculate a value (which is referred to as "hotness" below) of the target function according to a clustering density and a clustering distance that correspond to each point in the Rpoint, to obtain a coordinate hotness set Rcluster<point, hot_value>. The hot_value is hotness of the geographic coordinates point. The hotness represents a Gaussian density distribution value of geographic coordinates, and greater hotness indicates a greater probability that corresponding geographic coordinates are used as a cluster center point and indicates that more aggregation is achieved.

In addition, when there is no extended POI that meets the screening condition, that is, the valid POI set Rpoi is empty, the processed coordinates are selected in the Raddr. The computer device sorts a plurality of points in descending order according to the hotness, selects geographic coordinates point with largest hotness, where the selected geographic coordinates may be considered as geographic coordinates with a relatively large clustering density and a relatively large clustering distance, and determines the geographic coordinates obtained through the screening as processed coordinates corresponding to the address text.

In one embodiment, when there is no extended POI that meets the screening condition, the geographic coordinates corresponding to the extended addresses are screened to obtain geographic coordinates with the highest aggregation as the processed coordinates, thereby ensuring the accuracy of the processing result.

In some embodiments, in a scenario in which error correction is performed on geographic coordinates, when there is no extended POI that meets the screening condition, the screening the geographic coordinates corresponding to the extended addresses to obtain geographic coordinates with the highest aggregation as the processed coordinates may include: when there is no extended POI that meets the screening condition, screening the geographic coordinates corresponding to the extended addresses to obtain the geographic coordinates with the highest aggregation as the corrected coordinates, thereby ensuring the accuracy of the error correction result.

In an embodiment, the determining, according to a clustering feature of the geographic coordinates, geographic coordinates obtained through the screening as processed coordinates includes: calculating, when there is an extended POI that meets the screening condition, a text similarity between the extended POI and an associated POI included in a corresponding associated address; determining whether there is an associated address of which a text similarity exceeds a first threshold; recognizing, when the text similarity of the associated address exceeds the first threshold, whether identical geographic coordinates exist in the associated address and the extended address obtained through the screening, the identical geographic coordinates being recorded as intersection coordinates; and determining, when there are a plurality of intersection coordinates according to clustering features of the intersection coordinates, intersection coordinates as the processed coordinates.

That is, the associated address corresponding to each of the geographic coordinates obtained through the screening is obtained, and a text similarity between the extended POI text and an associated POI text included in each associated address corresponding to the extended POI text is calculated; it is determined whether there is an associated address of which a text similarity exceeds a first threshold; when a text similarity of any associated address exceeds the first threshold, identical geographic coordinates in the associated address and the extended address obtained through the screening are recognized, and the identical geographic coordinates are recorded as intersection coordinates; and when there are a plurality of intersection coordinates, intersection coordinates obtained through the screening are determined as the processed coordinates according to a clustering feature of each of the intersection coordinates.

In some embodiments, in a scenario in which error correction is performed on the geographic coordinates, the determining, when there are a plurality of intersection coordinates, intersection coordinates obtained through the screening as the processed coordinates according to a clustering feature of each of the intersection coordinates may include: determining, when there are the plurality of intersection coordinates according to the clustering feature of each of the intersection coordinates, the intersection coordinates obtained through the screening as the corrected coordinates.

The text similarity is a value used for representing a similarity between a name of an extended POI and a name of an associated POI, and may be calculated according to an algorithm such as a cosine similarity, a simple common word, an edit distance, a Hamming distance, or a Euclidean distance.

The intersection coordinates refer to the identical geographic coordinates point in the target POI set and the valid address set Raddr. The target POI set is a POI set obtained by screening the valid POI set Rpoi to obtain an associated address of which a text similarity with a corresponding extended POI exceeds the first threshold. The first threshold may be freely set according to requirements, for example, 0.5. The target POI set may be recorded as Rright_poi<point, input_poi, output_poi, similar_score>, similar_score being a text similarity between input_poi and output_poi.

In some embodiments, the computer device calculates a text similarity between each extended POI and an associated POI included in each associated address corresponding to the extended POI, and recognizes whether there is an associated POI of which a text similarity exceeds a first threshold. If there is no associated POI of which a text similarity exceeds the first threshold, the computer device returns processing failure prompt information to a terminal reporting the address text.

In another embodiment, when there is no associated POI in which a text similarity exceeds the first threshold, the computer device generates a processing task according to the address text and the fence identifier, and publishes the processing task to a geocoding operation platform (recorded as a GEO operation platform). A task terminal runs a GEO operation client. The operator may access the GEO operation platform by using the GEO operation client on the task terminal to process the processing task. The GEO operation client displays a processing task management page. The processing task management page displays task identifiers of a plurality of processing tasks and attribute information such as a corresponding address text, a processing result, and a processing time.

Figure 5:
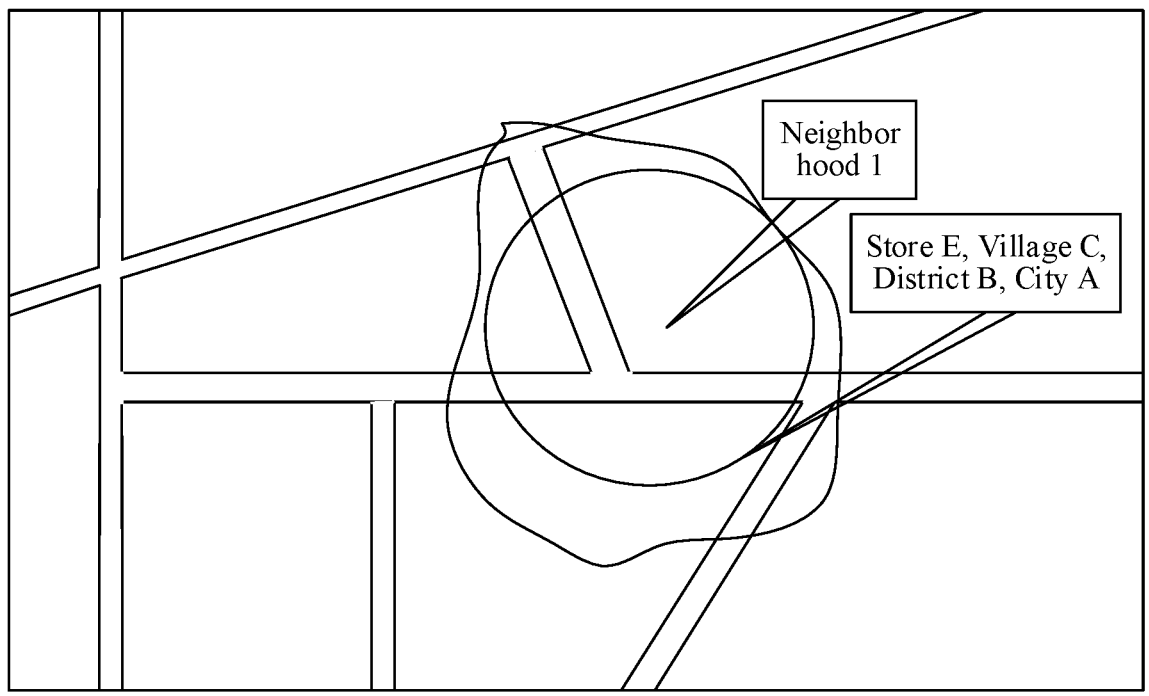
FIG. 5 is a schematic diagram of an interface of a map display region according to an embodiment.
Figure 7:
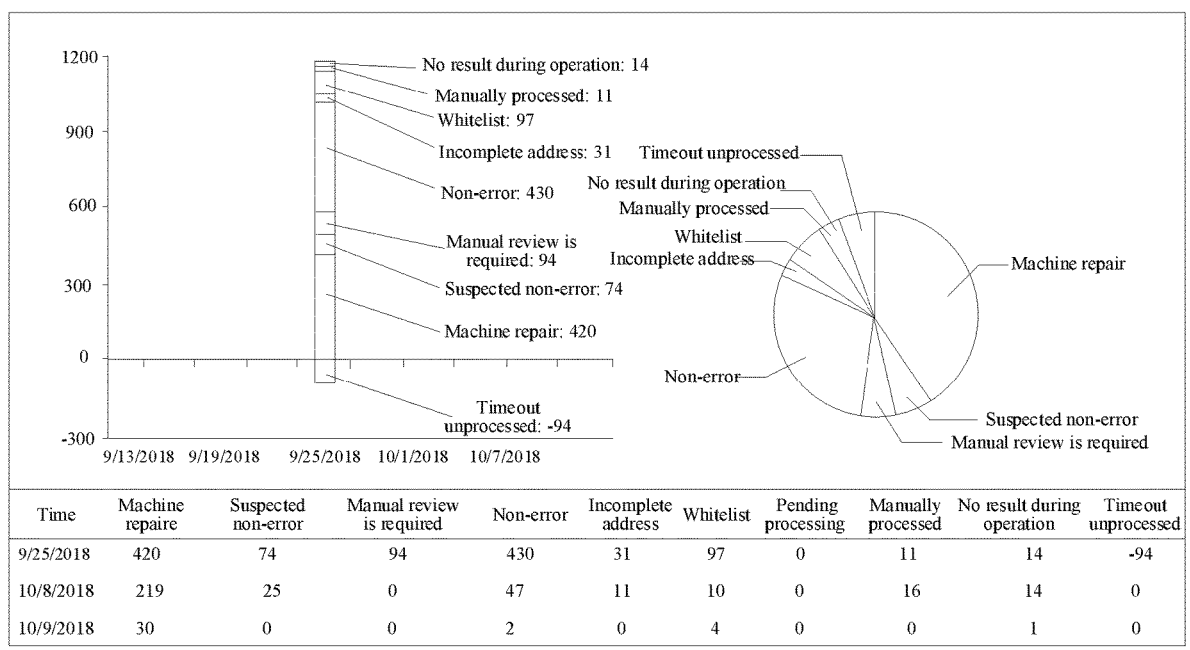
FIG. 7 is a schematic diagram of an interface of an error correction task statistical result page according to an embodiment.

The task terminal jumps, when obtaining a trigger operation of a user for a particular task identifier, from the processing task management page to a processing page of a corresponding processing task. The processing page of the processing task includes a processing task list region and a map display region. The processing task list region displays a plurality of processing tasks and corresponding attribute information in the form of a list. FIG. 5 is a schematic diagram of an interface of a map display region according to an embodiment. As shown in FIG. 5, the operator selects a processing task that needs to be currently processed from the plurality of processing tasks displayed by the processing task list region, and the map display region displays a digital map and displays a fence identifier and a fence contour that correspond to the selected processing task in the digital map. The operator determines geographic coordinates that meet address text information by clicking within the fence contour and submits the geographic coordinates. In still another embodiment, the processing page of the processing task further includes a peripheral retrieval auxiliary region. FIG. 6 is a schematic diagram of an interface of a peripheral retrieval auxiliary region according to an embodiment. The operator may enter a retrieval keyword in an auxiliary positioning box displayed in the map display region, and the peripheral retrieval auxiliary region displays a retrieval result based on the retrieval keyword. For example, a retrieval keyword "New Mansion" is entered, and four related retrieval results meeting the name appear on the right side. The operator may assist in determining based on these related retrieval results for submission of an operation result. The GEO operation platform may further count whether the address text has a coordinate error, an error correction mode, or the like, and display a statistical result. FIG. 7 is a schematic diagram of an interface of an error correction task statistical result page according to an embodiment.

In addition, if there is an associated POI of which a text similarity exceeds a threshold, the computer device screens points in the valid POI set Rpoi depending on whether the text similarity exceeds the first threshold, to obtain the target POI set Rrightpoi. The computer device recognizes whether there are intersection coordinates between the Rrightpoi and the Raddr. If there are intersection coordinates, the computer device directly uses the intersection coordinates as the processed coordinates corresponding to the address text. If there are a plurality of intersection coordinates, the computer device calculates a clustering density and a clustering distance of each of the intersection coordinates, determines a target function for maximizing the clustering densities and the clustering distances that correspond to the intersection coordinates, and determines, by performing screening, geographic coordinates with a largest value of a corresponding target function as the processed coordinates. The determining a target function for maximizing the clustering densities and the clustering distances that correspond to the intersection coordinates, and determining, by performing screening, geographic coordinates with a largest value of a corresponding target function as the processed coordinates refers to: determining the target function for maximizing the clustering densities and the clustering distances that correspond to the intersection coordinates, determining a value of a target function corresponding to the intersection coordinates according to the target function, and determining intersection coordinates with the largest value of the target function as the processed coordinates.

In one embodiment, the clustering feature and the text similarity are comprehensively considered, a multi-level coordinate screening policy is formed, and the extended POI and the geographic coordinates of the extended address are screened based on the multi-level coordinate screening policy, thereby improving the accuracy of the processing result.

In an embodiment, the geo-fence based coordinate data processing method further includes: traversing, when there are no intersection coordinates, geographic coordinates of a plurality of associated addresses obtained through the screening in descending order of text similarities; calculating a coordinate distance between geographic coordinates of a current associated address and the geographic coordinates corresponding to each extended address obtained through the screening; determining, when the coordinate distance is less than a second threshold, the geographic coordinates of the current associated address as the processed coordinates; and determining, when there are still no geographic coordinates that cause the coordinate distance is less than the second threshold after all the associated addresses have been traversed, geographic coordinates of an associated address with a highest text similarity as the processed coordinates.

When there are no intersection coordinates, geographic coordinates of a plurality of associated addresses obtained through the screening are traversed in descending order of text similarities; a coordinate distance between geographic coordinates of each of the plurality of associated addresses obtained through the screening and the geographic coordinates corresponding to each extended address obtained through the screening is calculated; when any coordinate distance obtained is less than a second threshold, geographic coordinates of an associated address corresponding to the coordinate distance are determined as the processed coordinates; and when there are still no geographic coordinates that cause the coordinate distance to be less than the second threshold after all the associated addresses have been traversed, geographic coordinates of an associated address with a highest text similarity are determined as the processed coordinates. The coordinate distance refers to a distance between coordinate points corresponding to two geographic coordinates on the digital map or a corresponding actual spatial distance.

In some embodiments, if there are no intersection coordinates, the computer device traverses points in the Rright_poi<point, input_poi, output_poi, similar_score>according to the text similarity similar_score in descending order, calculates a coordinate distance between geographic coordinates CurPointright_poi corresponding to a current associated address and each point in the Raddr, and determines whether there is a point of which a coordinate distance is less than a second threshold. If there is a point of which a coordinate distance is less than the second threshold, the computer device determines the geographic coordinates CurPointright_poi corresponding to the coordinate distance as the processed coordinates corresponding to the address text.

In addition, if there is no point of which a coordinate distance is less than the second threshold, the computer device continues to traverse geographic coordinates corresponding to a next associated address in the CurPointright_poi in the manner described above. Such a process is repeated until that geographic coordinates of a point of which a coordinate distance is less than the second threshold exist in the Raddr is queried in the Rright_poi. When a last associated address is traversed, but there is still no point of geographic coordinates CurPointright_poi corresponding to the last associated address of which a coordinate distance is less than the second threshold, the computer device determines geographic coordinates of an associated address with a highest text similarity in the Rright_poi as the processed coordinates.

In another embodiment, after determining the processed coordinates corresponding to the address text, the computer device stores the address text and the processed coordinates to a preset coordinate whitelist in an association manner. After subsequently receiving an address text reported by the terminal, the computer device may preferentially query whether a similar address text is stored in the coordinate whitelist, directly uses, if there is a similar address text, processed coordinates of the similar address text as coordinates of a current address text and performs coordinate processing on the processed coordinates. Only when no address text is queried in the coordinate whitelist, the address text needs to be processed and calculated according to the foregoing logic, thereby saving calculation resources of the computer device and improving the coordinate processing efficiency.

In one embodiment, whether geographic coordinates selected based on the clustering feature and the text similarity can be used as the final processed coordinates is determined with the aid of a distance between geographic coordinates, and the geographic coordinates are strictly screened layer by layer, thereby improving the accuracy of a processing result.

Figure 8:
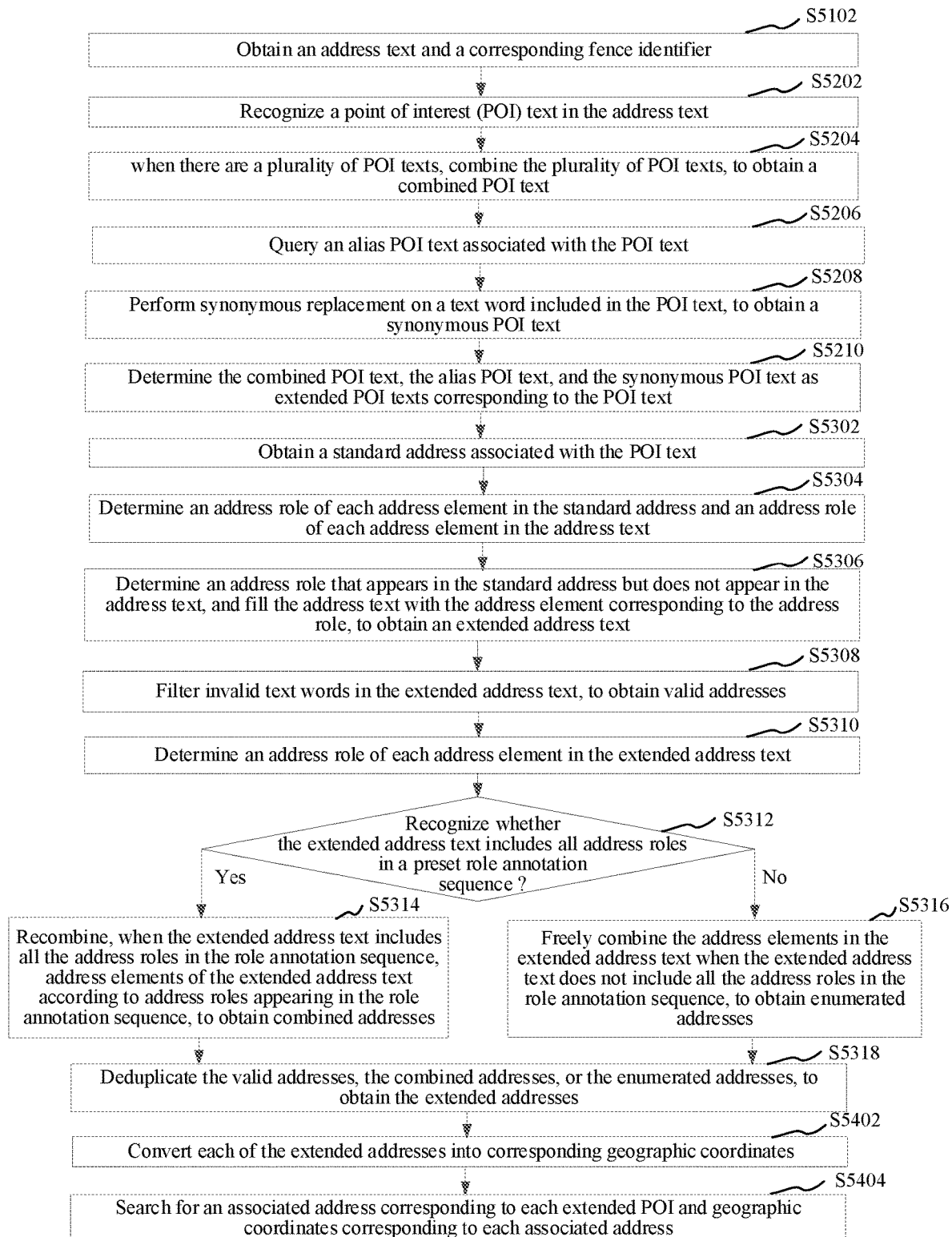
FIG. 8 is a schematic flowchart of a geo-fence based coordinate data processing method according to an embodiment.
Figure 9:
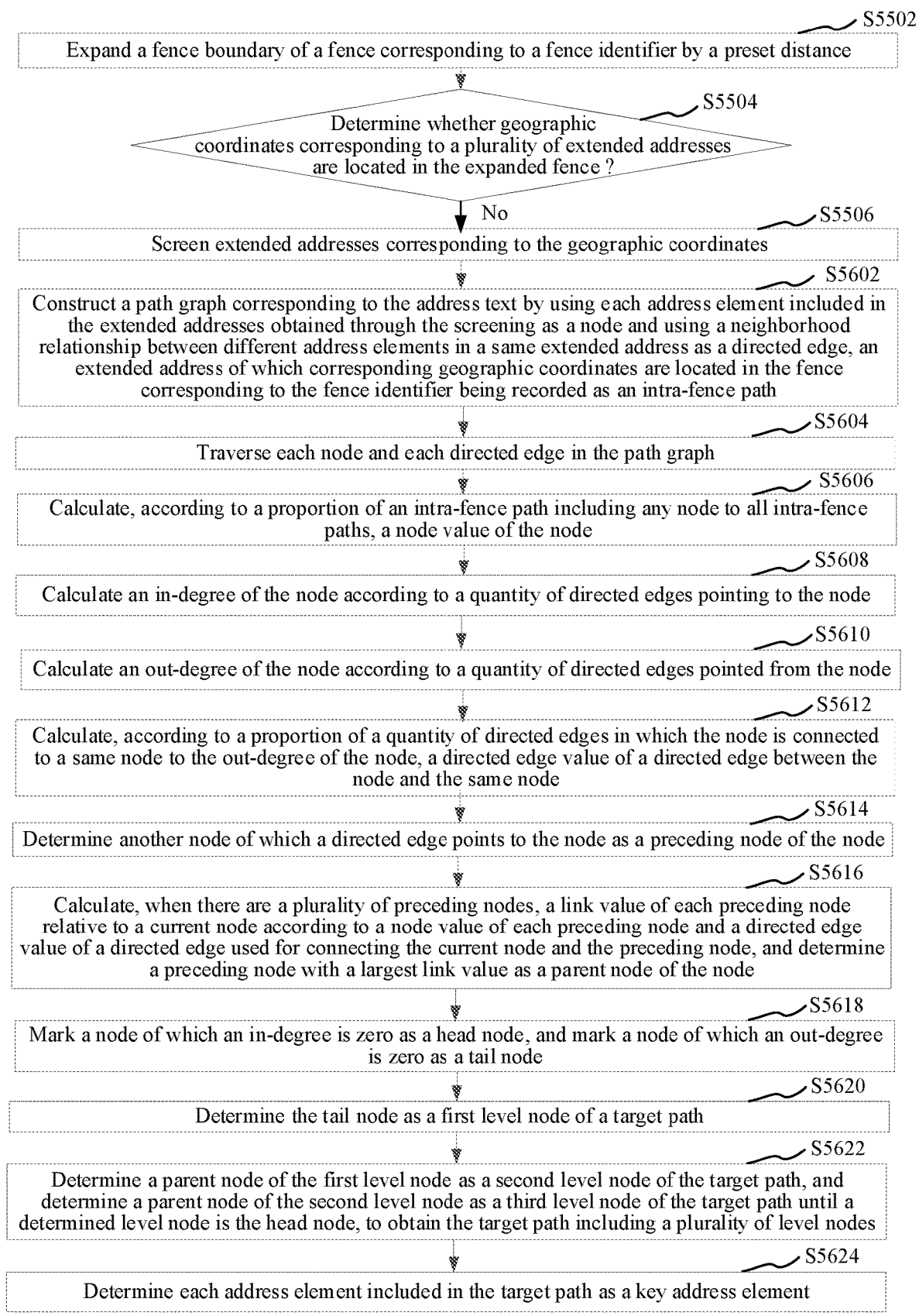
FIG. 9 is a schematic flowchart of a geo-fence based coordinate data processing method according to an embodiment.
Figure 10:
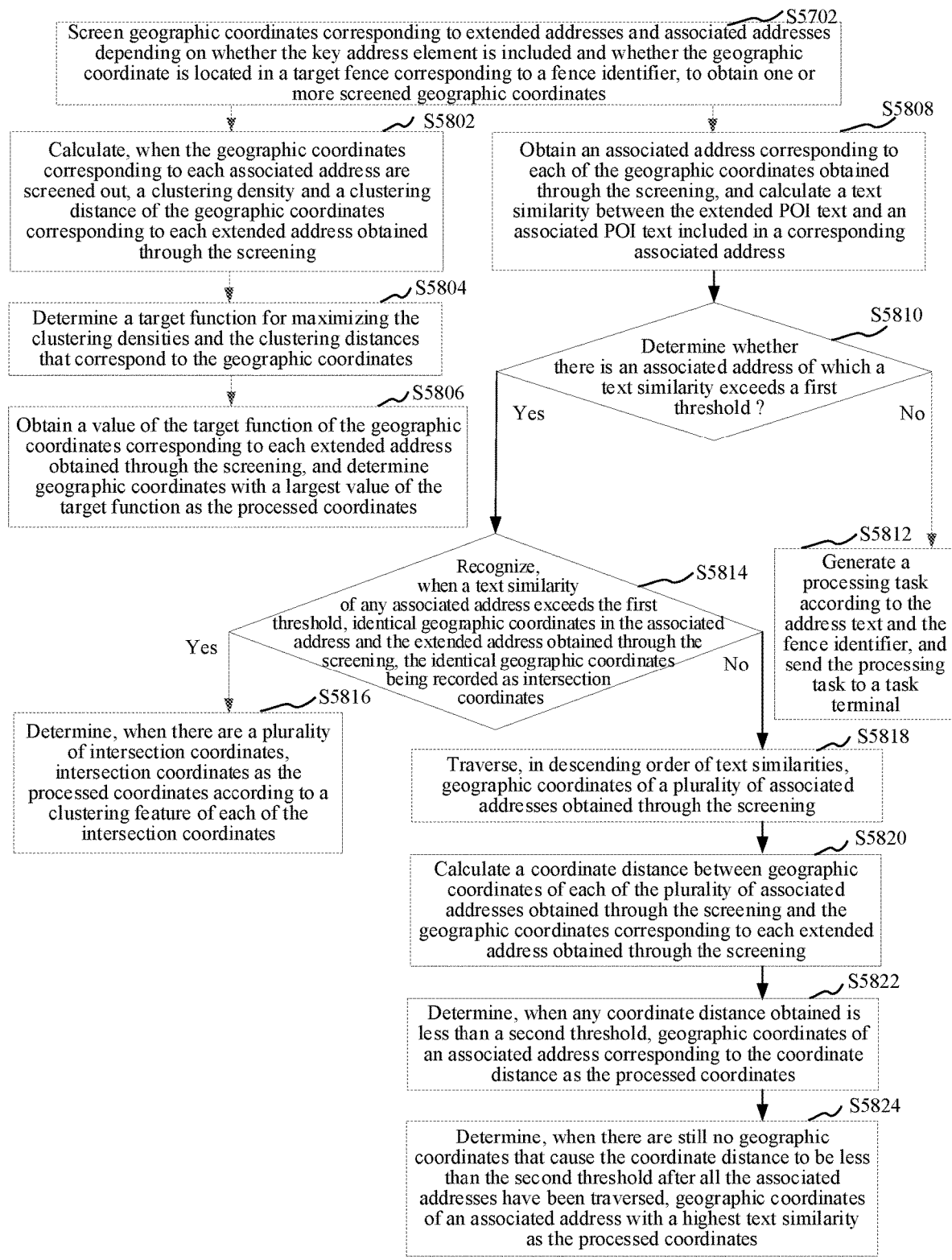
FIG. 10 is a schematic flowchart of a geo-fence based coordinate data processing method according to an embodiment.

FIG. 8, FIG. 9, and FIG. 10 collectively show a schematic flowchart of a geo-fence based coordinate data processing method according to a specific embodiment. As shown in FIG. 8, the geo-fence based coordinate data processing method includes steps of obtaining an address text S5102, POI extension S5202 to S5210, address extension S5302 to S5318, and coordinate conversion S5402 to S5404, as follows:

S5102. Obtain an address text and a corresponding fence identifier.

S5202. Recognize a POI text in the address text.

S5204. When there are a plurality of POI texts, combine the plurality of POI texts, to obtain a combined POI text.

S5206. Query an alias POI text associated with the POI text.

S5208. Perform synonymous replacement on a text word included in the POI text, to obtain a synonymous POI text.

S5210. Determine the combined POI text, the alias POI text, and the synonymous POI text as extended POI texts corresponding to the POI text.

S5302. Obtain a standard address associated with the POI text.

S5304. Determine an address role of each address element in the standard address and an address role of each address element in the address text.

S5306. Determine an address role that appears in the standard address but does not appear in the address text, and fill the address text with the address element corresponding to the address role, to obtain an extended address text.

S5308. Filter invalid text words in the extended address text, to obtain a valid address.

S5310. Determine an address role of each address element in the extended address text.

S5312. Recognize whether the extended address text includes all address roles in a preset role annotation sequence.

S5314. Recombine, when the extended address text includes all the address roles in the role annotation sequence, address elements of the extended address text according to address roles appearing in the role annotation sequence, to obtain combined addresses.

S5316. Freely combine the address elements in the extended address text when the extended address text does not include all the address roles in the role annotation sequence, to obtain enumerated addresses.

S5318. Deduplicate the valid address, the combined addresses, or the enumerated addresses, to obtain extended addresses.

S5402. Convert each of the extended addresses into corresponding geographic coordinates.

S5404. Search for an associated address corresponding to each extended POI and geographic coordinates corresponding to each associated address.

As shown in FIG. 9, the geo-fence based coordinate data processing method further includes steps of first fence constraint S5502 to S5506 and key address element detection S5602 to S5624, as follows:

S5502. Expand a fence boundary of a fence corresponding to the fence identifier by a preset distance.

S5504. Determine whether geographic coordinates corresponding to a plurality of extended addresses are located in the expanded fence.

S5506. Screen, when any geographic coordinates are not located in the expanded fence, an extended address corresponding to the geographic coordinates.

S5602. Construct a path graph corresponding to the address text by using each address element included in the extended addresses obtained through the screening as a node and using a neighborhood relationship between different address elements in a same extended address as a directed edge, an extended address of which corresponding geographic coordinates are located in the fence corresponding to the fence identifier being recorded as an intra-fence path.

S5604. Traverse each node and each directed edge in the path graph.

S5606. Calculate, according to a proportion of an intra-fence path including any node to all intra-fence paths, a node value of the node.

S5608. Calculate an in-degree of the node according to a quantity of directed edges pointing to the node.

S5610. Calculate an out-degree of the node according to a quantity of directed edges pointed from the node.

S5612. Calculate, according to a proportion of a quantity of directed edges in which the node is connected to a same node to the out-degree of the node, a directed edge value of a directed edge between the node and the same node.

S5614. Determine another node of which a directed edge points to the node as a preceding node of the node.

S5616. Calculate, when there are a plurality of preceding nodes, a link value of each preceding node relative to a current node according to a node value of each preceding node and a directed edge value of a directed edge used for connecting the current node and each preceding node, and determine a preceding node with a largest link value as a parent node of the node.

S5618. Mark a node having a zero in-degree as a head node, and mark a node having a zero out-degree as a tail node.

S5620. Determine the tail node as a first level node of a target path.

S5622. Determine a parent node of the first level node as a second level node of the target path, and determine a parent node of the second level node as a third level node of the target path until a determined level node is the head node, to obtain the target path including a plurality of level nodes.

S5624. Determine each address element included in the target path as a key address element.

As shown in FIG. 10, the geo-fence based coordinate data processing method includes steps of screening coordinates based on a key address element and second fence constraint S5702, performing extraction by using a clustering feature, comparing text similarities, and calculating a coordinate distance to determine processed coordinates S5802 to S5824, as follows:

S5702. Screen geographic coordinates corresponding to extended addresses and associated addresses depending on whether key address element(s) are included and whether the geographic coordinates are located in a target fence corresponding to the fence identifier, to obtain one or more screened geographic coordinates.

S5802. Calculate, when the geographic coordinates corresponding to each associated address are screened out, a clustering density and a clustering distance of the geographic coordinates corresponding to each extended address obtained through the screening.

S5804. Determine a target function for maximizing the clustering densities and the clustering distances that correspond to the geographic coordinates.

S5806. Obtain a value of the target function of the geographic coordinates corresponding to each extended address obtained through the screening, and determine geographic coordinates with a largest value of the target function as the processed coordinates.

S5808. Obtain an associated address corresponding to each of the geographic coordinates obtained through the screening, and calculate a text similarity between the extended POI text and an associated POI text included in each associated address corresponding to the extended POI text.

S5810. Determine whether there is an associated address of which a text similarity exceeds a first threshold.

S5812. Generate a processing task according to the address text and the fence identifier when there is no associated address of which a text similarity exceeds the first threshold, and send the processing task to a task terminal.

S5814. Recognize, when a text similarity of any associated address exceeds the first threshold, identical geographic coordinates in the associated address and the extended address obtained through the screening, the identical geographic coordinates being recorded as intersection coordinates.

S5816. Determine, when there are a plurality of intersection coordinates, intersection coordinates as the processed coordinates according to a clustering feature of each of the intersection coordinates.

S5818. Traverse, when there are no intersection coordinates, geographic coordinates of a plurality of associated addresses obtained through the screening in descending order of text similarities.

S5820. Calculate a coordinate distance between geographic coordinates of each of the plurality of associated addresses obtained through the screening and the geographic coordinates corresponding to each extended address obtained through the screening.

S5822. Determine, when any coordinate distance obtained is less than a second threshold, geographic coordinates of an associated address corresponding to the coordinate distance as the processed coordinates.

S5824. Determine, when there are still no geographic coordinates that cause the coordinate distance to be less than the second threshold after all the associated addresses have been traversed, geographic coordinates of an associated address with a highest text similarity as the processed coordinates.

According to the geo-fence based coordinate data processing method, by performing semantic extension on an obtained address text, a plurality of extended addresses may be obtained, and the obtained extended addresses may be respectively converted into corresponding geographic coordinates, thereby obtaining a plurality of possible geographic coordinates. Compared with an existing solution in which unique geographic coordinates are obtained through geocoding only based on an address text, impact of irregular description of the address text or single information on the accuracy of the geographic coordinates obtained through the conversion may be reduced, and more possibilities are covered from a coordinate source level. In the plurality of geographic coordinates obtained through the extension, region constraint is performed based on a target fence, the geographic coordinates are screened depending on whether the recognized key address element(s) are included, and some invalid geographic coordinates may be filtered. Final geographic coordinates are determined based on a clustering feature in the geographic coordinates obtained through the screening and filtering, and the accuracy of the processing result can be improved based on the multi-level screening and a high aggregation requirement. In addition, the corresponding processed coordinates may be quickly fed back by only providing the address text, the manual processing costs are reduced, and the timeliness of processing a coordinate data processing task can be improved.

Figure 11:
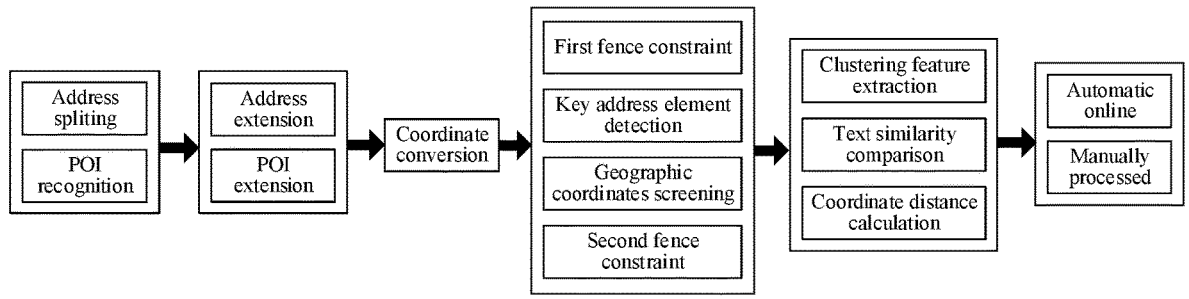
FIG. 11 is a schematic principle diagram of a geo-fence based coordinate data processing method according to an embodiment.

FIG. 11 is a schematic principle diagram of a geo-fence based coordinate data processing method according to an embodiment. As shown in FIG. 11, the principle of processing an obtained address text by the computer device is to perform coordinate screening after performing coordinate expansion on the address text. In some embodiments, after performing address splitting and POI recognition on an address text, the computer device performs address extension and POI extension, converts extended addresses and extended POIs into corresponding geographic coordinates respectively, screens, after performing first fence constraint on the geographic coordinates of the extended addresses, the geographic coordinates corresponding to the extended addresses and the extended POIs depending on whether the recognized key address element(s) are included, and performs second fence constraint on the geographic coordinates obtained through the screening. The geographic coordinates after being subject to the second fence constraint are further screened according to information about a plurality of dimensions such as a clustering feature, a text similarity, and a coordinate distance, to obtain final processed coordinates. The computer device launches the processed coordinates, that is, writes the processed coordinates into a coordinate whitelist. If processing fails based on the geo-fence based coordinate data processing method, the process is performed manually.

According to the geo-fence based coordinate data processing method, the coverage of resolving a large quantity of fed back error coordinate events and the timeliness may be improved, a large amount of manpower is saved, an effective automatic correction capability is provided, and the objective of repairing data online in a short time is achieved. By using a technology such as address segmentation, POI entity and key address element recognition, re-combination of standard addresses, extension/address extension, or POI entity retrieval, a valid coordinate set is obtained, multi-level screening is performed on coordinates by using fence constraint, coordinate aggregation, text similarity, or the like, and the coordinate processing efficiency and accuracy are improved while the complexity of secondary query based on a model is ingeniously avoided.

FIG. 2 and FIG. 5 are schematic flowcharts of a geo-fence based coordinate data processing method according to an embodiment. It is to be understood that, although each step of the flowcharts in FIG. 2 and FIG. 5 is displayed sequentially according to arrows, the steps are not necessarily performed according to an order indicated by arrows. Unless clearly specified in this specification, there is no strict sequence limitation on the execution of the steps, and the steps may be performed in another sequence. Furthermore, at least some steps in FIG. 2 and FIG. 5 may include a plurality of sub-steps or a plurality of stages. The sub-steps or stages are not necessarily performed at the same moment, and may be performed at different moments. The sub-steps or stages are not necessarily performed in order, and may be performed in turn or alternately with other steps or at least some of sub-steps or stages of other steps.

Figure 12:
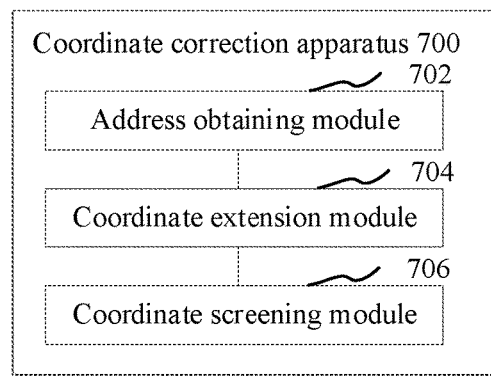
FIG. 12 is a structural block diagram of a geo-fence based coordinate data processing apparatus according to an embodiment.

As shown in FIG. 12, in an embodiment, a geo-fence based coordinate data processing apparatus 700 is provided, including an address obtaining module 702, a coordinate extension module 704, and a coordinate screening module 706.

The address obtaining module 702 is configured to obtain an address text and a corresponding fence identifier.

The coordinate extension module 704 is configured to perform semantic extension on the address text to obtain a plurality of extended addresses; and convert each of the extended addresses into corresponding geographic coordinates.

The coordinate screening module 706 is configured to recognize key address element(s) in the plurality of extended addresses; screen the geographic coordinates depending on whether an extended address corresponding to a geographic coordinates includes the recognized key address element and whether the geographic coordinate is located in a target fence corresponding to the fence identifier, to obtain one or more screened geographic coordinates; and determine, according to a clustering feature of each of the screened geographic coordinates, one of the screened geographic coordinates as a processed coordinate.

Figure 13:
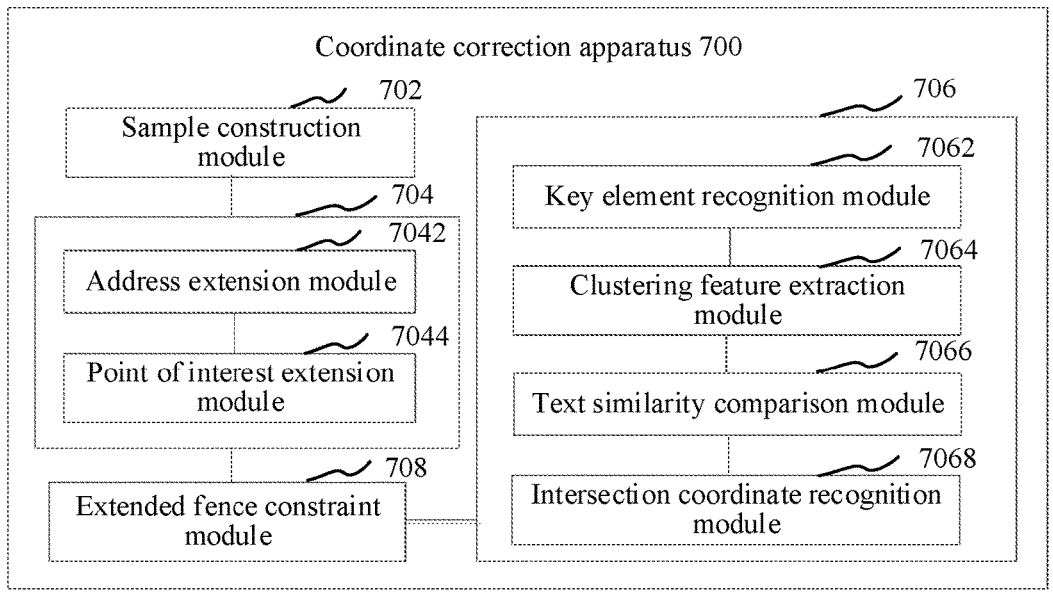
FIG. 13 is a structural block diagram of a geo-fence based coordinate data processing apparatus according to another embodiment.

In an embodiment, as shown in FIG. 13, the coordinate extension module 704 includes an address extension module 7042, configured to obtain a standard address associated with a POI text included in the address text; determine an address role of each address element in the standard address and an address role of each address element in the address text; and determine an address role that appears in the standard address but does not appear in the address text, and fill the address text with the address element corresponding to the address role, to obtain an extended address.

In an embodiment, the address extension module 7042 is further configured to filter invalid text words in the address text, to obtain a valid address; determine the address role of each address element in the address text; recognize whether the address text includes all address roles in a preset role annotation sequence; recombine, when the address text includes all the address roles in the role annotation sequence, address elements of the address text according to address roles appearing in the role annotation sequence, to obtain combined addresses, and deduplicate the valid address and the combined addresses, to obtain the plurality of extended addresses; freely combine the address elements in the address text when the address text does not include all the address roles in the role annotation sequence, to obtain enumerated addresses; and deduplicate the valid address and the enumerated addresses, to obtain the plurality of extended addresses.

In an embodiment, as shown in FIG. 13, the geo-fence based coordinate data processing apparatus 700 further includes an extended fence constraint module 708, configured to expand a fence boundary of a fence corresponding to the fence identifier by a preset distance; determine whether geographic coordinates corresponding to the plurality of extended addresses are located in the expanded fence; screen, when any geographic coordinates are not located in the expanded fence, the extended address corresponding to the geographic coordinates. The coordinate screening module 706 is further configured to recognize the key address element(s) in the extended addresses obtained through the screening.

In an embodiment, as shown in FIG. 13, the coordinate screening module 706 includes a key element recognition module 7062, configured to construct a path graph corresponding to the address text by using each address element included in the plurality of extended addresses as a node and using a neighborhood relationship between different address elements in a same extended address as a directed edge; calculate a node value of each node in the path graph and a directed edge value of a directed edge between any two neighboring nodes; determine a target path according to each node value and each directed edge value; and determine each address element included in the target path as the key address element.

In an embodiment, when a geographic coordinate corresponding to any extended address is located in a fence corresponding to the fence identifier, the extended address is recorded as an intra-fence path; and the key element recognition module 7062 is further configured to traverse each node and each directed edge in the path graph; calculate, according to a proportion of an intra-fence path including any node to all intra-fence paths, a node value of the node; calculate an out-degree of the node according to a quantity of directed edges pointed from the node; and calculate, according to a proportion of a quantity of directed edges in which the node is connected to a same node to the out-degree of the node, a directed edge value of a directed edge between the node and the same node.

In an embodiment, the key element recognition module 7062 is further configured to determine a parent node of each node according to each node value and each directed edge value; calculate an in-degree of each node according to a quantity of directed edges pointing to each node; determine a tail node as a first level node of the target path; and determine a parent node of the first level node as a second level node of the target path, and determine a parent node of the second level node as a third level node of the target path until a determined level node is a head node, to obtain the target path including a plurality of level nodes.

In an embodiment, the key element recognition module 7062 is further configured to determine another node of which a directed edge points to a current node as a preceding node of the current node; and calculate, when there are a plurality of preceding nodes, a link value of each preceding node relative to the current node according to a node value of each preceding node and a directed edge value of a directed edge used for connecting the current node and a corresponding preceding node, and determine a preceding node with a largest link value as a parent node of the current node.

In an embodiment, as shown in FIG. 13, the coordinate extension module 704 further includes a POI extension module 7044, configured to recognize a POI text in the address text; and determine at least one of a combined POI text, an alias POI text, or a synonymous POI text as an extended POI text corresponding to the POI text, where when there are a plurality of POI texts, the combined POI text is obtained by combining the plurality POI texts, the alias POI text is obtained by querying an alias POI text associated with the POI text, and the synonymous POI text is obtained by performing synonymous replacement on a text word included in the POI text.

In an embodiment, the POI extension module 7044 is further configured to search for an associated address corresponding to each extended POI text and geographic coordinates corresponding to each associated address; and screen the geographic coordinates depending on whether an associated address corresponding to any of geographic coordinates obtained through the searching includes a key address element and whether the geographic coordinates are located in the target fence corresponding to the fence identifier.

In an embodiment, the coordinate screening module 706 further includes a clustering feature extraction module 7064, configured to calculate, when the geographic coordinates corresponding to each associated address are screened out, a clustering density and a clustering distance of geographic coordinates corresponding to each extended address obtained through the screening; determine a target function for maximizing the clustering densities and the clustering distances that correspond to the geographic coordinates; and obtain a value of the target function of the geographic coordinates corresponding to each extended address obtained through the screening, and determine geographic coordinates with a largest value of the target function as the processed coordinates.

In an embodiment, the coordinate screening module 706 further includes a text similarity comparison module 7066 and an intersection coordinate recognition module 7068. The text similarity comparison module 7066 is configured to obtain the associated address corresponding to each of the geographic coordinates obtained through the screening, and calculate a text similarity between the extended POI text and an associated POI text included in each associated address corresponding to the extended POI text; and determine whether there is an associated address of which a text similarity exceeds a first threshold. The intersection coordinate recognition module 7068 is configured to recognize, when a text similarity of any associated address exceeds the first threshold, identical geographic coordinates in the associated address and the extended address obtained through the screening are recognized, the identical geographic coordinates being recorded as intersection coordinates; and determine, when there are a plurality of intersection coordinates, intersection coordinates obtained through the screening as the processed coordinates according to a clustering feature of each of the intersection coordinates.

In an embodiment, the intersection coordinate recognition module 7068 is further configured to traverse, when there are no intersection coordinates, geographic coordinates of a plurality of associated addresses obtained through the screening in descending order of text similarities; calculate a coordinate distance between geographic coordinates of each of the plurality of associated addresses obtained through the screening and the geographic coordinates corresponding to each extended address obtained through the screening; determine, when any coordinate distance obtained is less than a second threshold, geographic coordinates of an associated address corresponding to the coordinate distance as the processed coordinates; and determine, when there are still no geographic coordinates that cause the coordinate distance to be less than the second threshold after all the associated addresses have been traversed, geographic coordinates of an associated address with a highest text similarity as the processed coordinates.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

According to the geo-fence based coordinate data processing apparatus, by performing semantic extension on an obtained address text, a plurality of extended addresses may be obtained, and the obtained extended addresses may be respectively converted into corresponding geographic coordinates, thereby obtaining a plurality of possible geographic coordinates. Compared with a conventional solution in which unique geographic coordinates are obtained through geocoding only based on an address text, impact of irregular description of the address text or single information on the accuracy of the geographic coordinates obtained through the conversion may be reduced, and more possibilities are covered from a coordinate source level. In the plurality of geographic coordinates obtained through the extension, region constraint is performed based on a target fence, the geographic coordinates are screened depending on whether the recognized key address element(s) are included, and some invalid geographic coordinates may be filtered. Final geographic coordinates that may be used as a processing result are determined based on a clustering feature in the geographic coordinates obtained through the screening and filtering, and the accuracy of the processing result can be improved based on the multi-level screening and a high aggregation requirement. In addition, the corresponding processed coordinates may be quickly fed back by only providing the address text, the manual processing costs are reduced, and the timeliness of processing a coordinate processing task can be improved.

Figure 14:
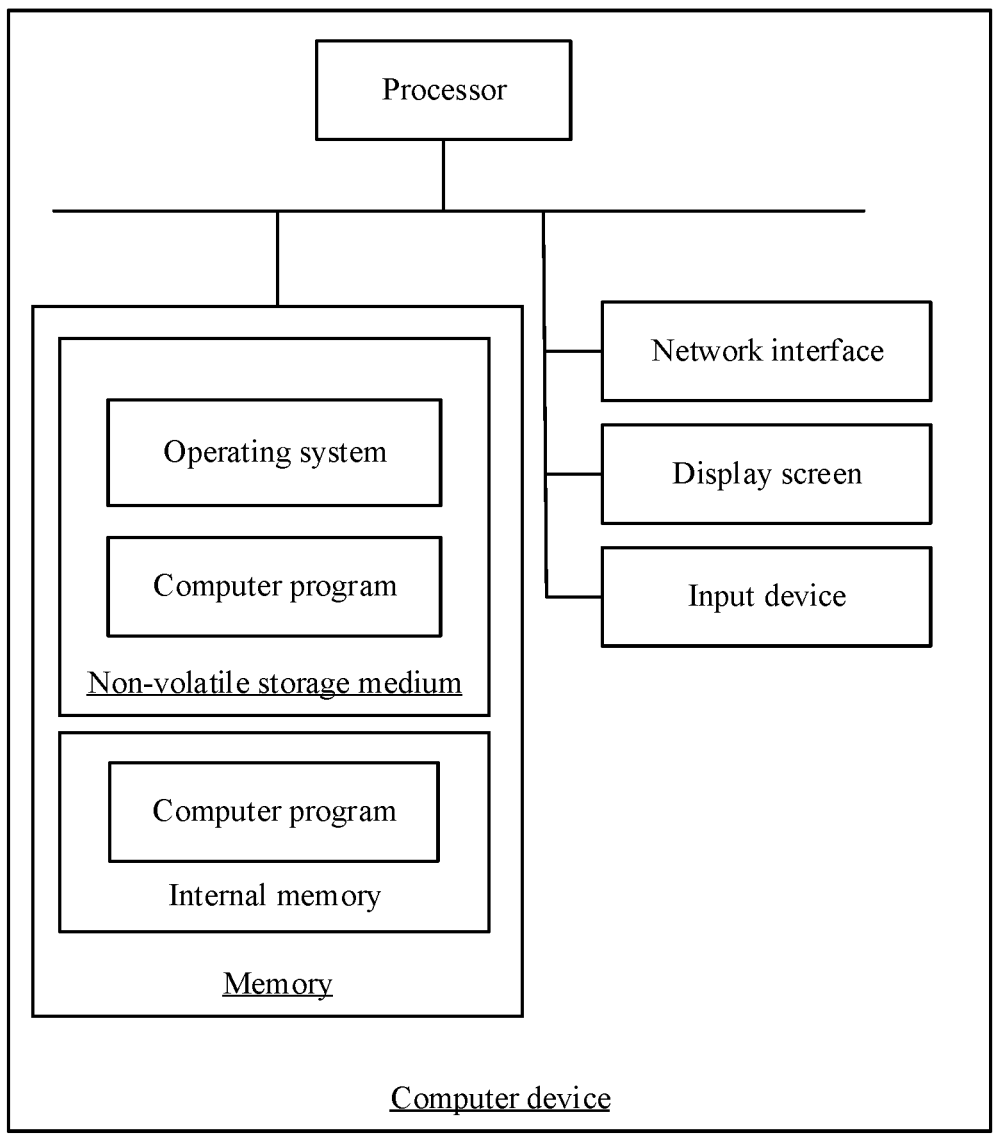
FIG. 14 is a structural block diagram of a computer device according to an embodiment.

FIG. 14 is a diagram of an internal structure of a computer device according to an embodiment. The computer device may be the terminal 110 in FIG. 1. As shown in FIG. 14, the computer device includes a processor, a memory, a network interface, an input apparatus, and a display screen that are connected by a system bus. The memory includes a non-volatile storage medium and an internal memory. The non-volatile storage medium of the computer device stores an operating system, and may further store a computer program, the computer program, when executed by the processor, causing the processor to perform the geo-fence based coordinate data processing method. The internal memory may also store a computer program. The computer program, when executed by the processor, may cause the processor to perform the geo-fence based coordinate data processing method. The display screen of the computer device may be a liquid crystal display screen or an e-ink display screen. The input apparatus of the computer device may be a touch layer covering the display screen, or a button, a trackball, or a touchpad disposed on a housing of the computer device, or an external keyboard, touchpad, mouse, or the like.

Figure 15:
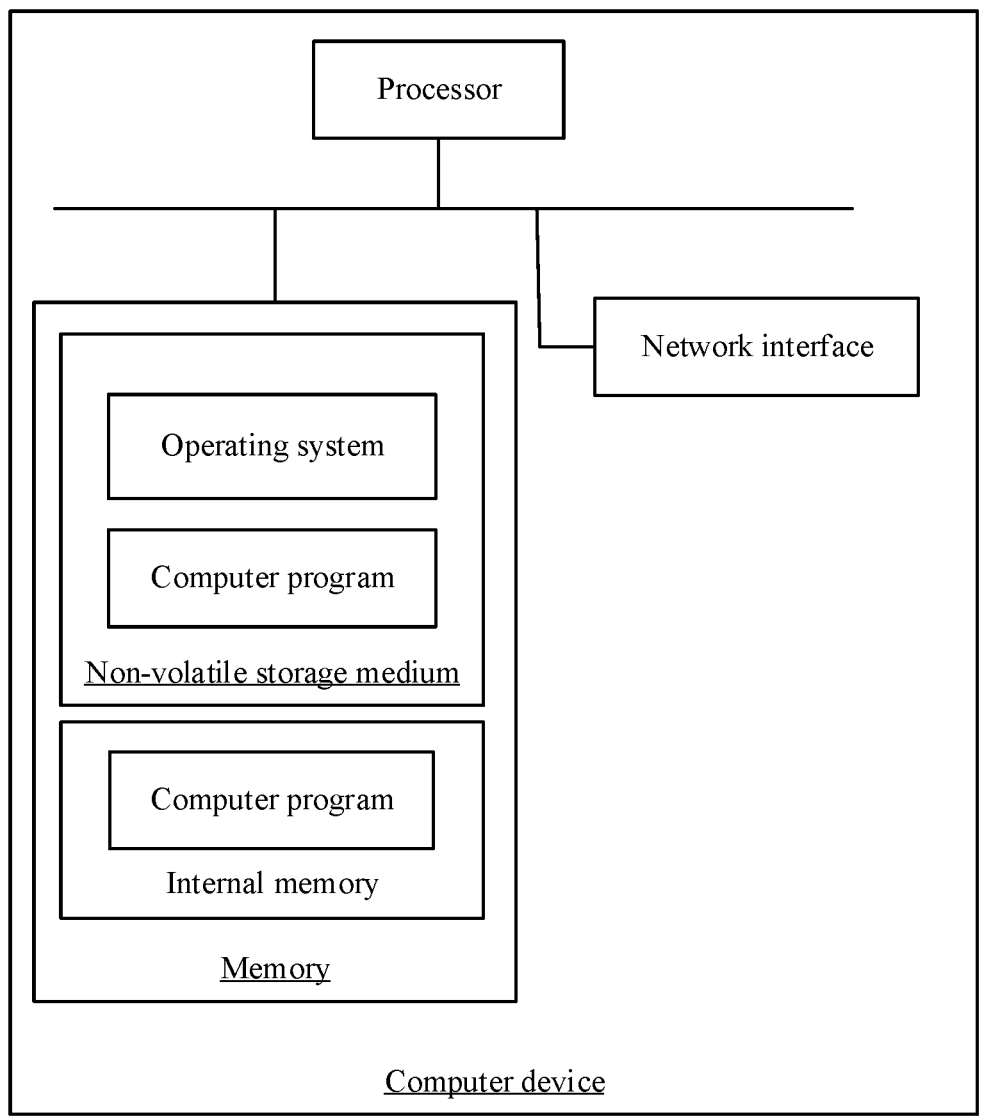
FIG. 15 is a structural block diagram of a computer device according to another embodiment.

FIG. 15 is a diagram of an internal structure of a computer device according to an embodiment. The computer device may be the server 120 in FIG. 1. As shown in FIG. 15, the computer device includes a processor, a memory, a network interface, and a database that are connected by using a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store standard addresses of a plurality of POI entities, a coordinate whitelist, or the like. The network interface of the computer device is configured to communicate with an external terminal through a network connection. The computer program is executed by the processor to implement the geo-fence based coordinate data processing method.

A person skilled in the art may understand that the structure shown in FIG. 14 and FIG. 15 is only a block diagram of a partial structure related to the solution of the present disclosure, and does not limit the computer device to which the solution of the present disclosure is applied. The computer device may include more or fewer components than those shown in the figure, or some components may be combined, or different component deployment may be used.

In an embodiment, the geo-fence based coordinate data processing apparatus provided in the present disclosure may be implemented in a form of a computer program, and the computer program may run on the computer device shown in FIG. 14 and FIG. 15. The memory of the computer device may store program modules such as the address obtaining module, the coordinate extension module, and the coordinate screening module shown in FIG. 12 forming the geo-fence based coordinate data processing apparatus. The computer program formed by the program modules causes the processor to perform the steps of the geo-fence based coordinate data processing method described in the embodiments of the present disclosure in this specification.

For example, the computer device shown in FIG. 14 and FIG. 15 may perform step S202 by using the address obtaining module in the geo-fence based coordinate data processing apparatus shown in FIG. 12. The computer device may perform step S204 to step S206 by using the coordinate extension module. The computer device may perform step S208 to step S212 by using the coordinate screening module.

In an embodiment, a computer device is provided, including a processor and a memory. The memory stores a computer program, the computer program, when executed by the processor, causing the processor to perform the steps of the geo-fence based coordinate data processing method. The steps of the geo-fence based coordinate data processing method herein may be the steps of the geo-fence based coordinate data processing method in the foregoing embodiments.

In an embodiment, a computer device is provided, including a memory and a processor, the memory storing a computer program, and the computer program, when executed by the processor, causing the processor to perform the following steps: obtaining an address text and a corresponding fence identifier; performing semantic extension on the address text to obtain a plurality of extended addresses; converting each extended addresses into corresponding geographic coordinates respectively; recognizing key address element(s) in the plurality of extended addresses; screening the geographic coordinates depending on whether an extended address corresponding to a geographic coordinates includes the recognized key address element and whether the geographic coordinate is located in a target fence corresponding to the fence identifier, to obtain one or more screened geographic coordinates; and determining, according to a clustering feature of each of the screened geographic coordinates, one of the screened geographic coordinates as a processed coordinate.

In an embodiment, the computer program, when executed by the processor, causes the processor to perform the following steps: obtaining a standard address associated with a POI text included in the address text; determining an address role of each address element in the standard address and an address role of each address element in the address text; determining an address role that appears in the standard address but does not appear in the address text; and filling the address text with the address element corresponding to the address role, to obtain an extended address.

In an embodiment, the computer program, when executed by the processor, causes the processor to perform the following steps: filtering invalid text words in the address text, to obtain a valid address; determining the address role of each address element in the address text; recognizing whether the address text includes all address roles in a preset role annotation sequence; recombining, when the address text includes all the address roles in the role annotation sequence, address elements of the address text according to address roles appearing in the role annotation sequence, to obtain combined addresses, and deduplicating the valid address and the combined addresses, to obtain the plurality of extended addresses; freely combining the address elements in the address text when the address text does not include all the address roles in the role annotation sequence, to obtain enumerated addresses; and deduplicating the valid address and the enumerated addresses, to obtain the plurality of extended addresses.

In an embodiment, the computer program, when executed by the processor, causes the processor to perform the following steps: expanding a fence boundary of a fence corresponding to the fence identifier by a preset distance; determining whether geographic coordinates corresponding to the plurality of extended addresses are located in the expanded fence; screening, when any geographic coordinates are not located in the expanded fence, the extended address corresponding to the geographic coordinates; and recognizing the key address element(s) in the extended addresses obtained through the screening.

In an embodiment, the computer program, when executed by the processor, causes the processor to perform the following steps: constructing a path graph corresponding to the address text by using each address element included in the plurality of extended addresses as a node and using a neighborhood relationship between different address elements in a same extended address as a directed edge; calculating a node value of each node in the path graph and a directed edge value of a directed edge between any two neighboring nodes; determining a target path according to each node value and each directed edge value; and determining each address element included in the target path as the key address element.

In an embodiment, the computer program, when executed by the processor, causes the processor to perform the following steps: where when a geographic coordinate corresponding to any extended address is located in a fence corresponding to the fence identifier, the extended address is recorded as an intra-fence path; traversing each node and each directed edge in the path graph; calculating, according to a proportion of an intra-fence path including any node to all intra-fence paths, a node value of the node; calculating an out-degree of the node according to a quantity of directed edges pointed from the node; and calculating, according to a proportion of a quantity of directed edges in which the node is connected to a same node to the out-degree of the node, a directed edge value of a directed edge between the node and the same node.

In an embodiment, the computer program, when executed by the processor, causes the processor to perform the following steps: determining a parent node of each node according to each node value and each directed edge value; calculating an in-degree of each node according to a quantity of directed edges pointing to each node; marking a node having a zero in-degree as a head node, and marking a node having a zero out-degree as a tail node; determining the tail node as a first level node of the target path; and determining a parent node of the first level node as a second level node of the target path, and determining a parent node of the second level node as a third level node of the target path until a determined level node is the head node, to obtain the target path including a plurality of level nodes.

In an embodiment, the computer program, when executed by the processor, causes the processor to perform the following steps: determining another node of which a directed edge points to a current node as a preceding node of the current node; and calculate, when there are a plurality of preceding nodes, a link value of each preceding node relative to the current node according to a node value of each preceding node and a directed edge value of a directed edge used for connecting the current node and a corresponding preceding node, and determine a preceding node with a largest link value as a parent node of the current node.

In an embodiment, the computer program, when executed by the processor, causes the processor to perform the following steps: recognizing a POI text in the address text; and determining at least one of a combined POI text, an alias POI text, or a synonymous POI text as an extended POI text corresponding to the POI text, where when there are a plurality of POI texts, the combined POI text is obtained by combining the plurality POI texts, the alias POI text is obtained by querying an alias POI text associated with the POI text, and the synonymous POI text is obtained by performing synonymous replacement on a text word included in the POI text.

In an embodiment, the computer program, when executed by the processor, causes the processor to perform the following steps: searching for an associated address corresponding to each extended POI text and geographic coordinates corresponding to each associated address; and screening the geographic coordinates depending on whether an associated address corresponding to any of geographic coordinates corresponding to each associated address includes a key address element and whether the geographic coordinates are located in the target fence corresponding to the fence identifier.

In an embodiment, the computer program, when executed by the processor, causes the processor to perform the following steps: calculating, when the geographic coordinates corresponding to each associated address are screened out, a clustering density and a clustering distance of geographic coordinates corresponding to each extended address obtained through the screening; determining a target function for maximizing the clustering densities and the clustering distances of the geographic coordinates; and obtaining a value of the target function of the geographic coordinates corresponding to each extended address obtained through the screening, and determining geographic coordinates with a largest value of the target function as the processed coordinates.

In an embodiment, the computer program, when executed by the processor, causes the processor to perform the following steps: obtaining the associated address corresponding to each of the geographic coordinates obtained through the screening, and calculating a text similarity between the extended POI text and an associated POI text included in each associated address corresponding to the extended POI text; determining whether there is an associated address of which a text similarity exceeds a first threshold; recognizing, when a text similarity of any associated address exceeds the first threshold, identical geographic coordinates in the associated address and the extended address obtained through the screening, the identical geographic coordinates being recorded as intersection coordinates; and determining, when there are a plurality of intersection coordinates, intersection coordinates obtained through the screening as the processed coordinates according to a clustering feature of each of the intersection coordinates.

In an embodiment, the computer program, when executed by the processor, causes the processor to perform the following steps: traversing, when there are no intersection coordinates, geographic coordinates of a plurality of associated addresses obtained through the screening in descending order of text similarities; calculating a coordinate distance between geographic coordinates of each of the plurality of associated addresses obtained through the screening and the geographic coordinates corresponding to each extended address obtained through the screening; determining, when any coordinate distance obtained is less than a second threshold, geographic coordinates of an associated address corresponding to the coordinate distance as the processed coordinates; and determining, when there are still no geographic coordinates that cause the coordinate distance is less than the second threshold after all the associated addresses have been traversed, geographic coordinates of an associated address with a highest text similarity as the processed coordinates.

In an embodiment, a computer-readable storage medium is provided, storing a computer program, the computer program, when executed by a processor, causing the processor to perform the steps of the geo-fence based coordinate data processing method. The steps of the geo-fence based coordinate data processing method herein may be the steps of the geo-fence based coordinate data processing method in the foregoing embodiments.

In an embodiment, a computer-readable storage medium is provided, storing a computer program, and the computer program, when executed by the processor, causing the processor to perform the following steps: obtaining an address text and a corresponding fence identifier; performing semantic extension on the address text to obtain a plurality of extended addresses; converting each extended addresses into corresponding geographic coordinates respectively; recognizing key address element(s) in the plurality of extended addresses; screening the geographic coordinates depending on whether an extended address corresponding to a geographic coordinates includes the recognized key address element and whether the geographic coordinate is located in a target fence corresponding to the fence identifier, to obtain one or more screened geographic coordinates; and determining, according to a clustering feature of each of the screened geographic coordinates, one of the screened geographic coordinates as a processed coordinate.

In an embodiment, the computer program, when executed by the processor, causes the processor to perform the following steps: obtaining a standard address associated with a POI text included in the address text; determining an address role of each address element in the standard address and an address role of each address element in the address text; determining an address role that appears in the standard address but does not appear in the address text; and filling the address text with the address element corresponding to the address role, to obtain an extended address.

In an embodiment, the computer program, when executed by the processor, causes the processor to perform the following steps: filtering invalid text words in the address text, to obtain a valid address; determining the address role of each address element in the address text; recognizing whether the address text includes all address roles in a preset role annotation sequence; recombining, when the address text includes all the address roles in the role annotation sequence, address elements of the address text according to address roles appearing in the role annotation sequence, to obtain combined addresses, and deduplicating the valid address and the combined addresses, to obtain the plurality of extended addresses; freely combining the address elements in the address text when the address text does not include all the address roles in the role annotation sequence, to obtain enumerated addresses; and deduplicating the valid address and the enumerated addresses, to obtain the plurality of extended addresses.

In an embodiment, the computer program, when executed by the processor, causes the processor to perform the following steps: expanding a fence boundary of a fence corresponding to the fence identifier by a preset distance; determining whether geographic coordinates corresponding to the plurality of extended addresses are located in the expanded fence; screening, when any geographic coordinates are not located in the expanded fence, the extended address corresponding to the geographic coordinates; and recognizing the key address element(s) in the extended addresses obtained through the screening.

In an embodiment, the computer program, when executed by the processor, causes the processor to perform the following steps: constructing a path graph corresponding to the address text by using each address element included in the plurality of extended addresses as a node and using a neighborhood relationship between different address elements in a same extended address as a directed edge; calculating a node value of each node in the path graph and a directed edge value of a directed edge between any two neighboring nodes; determining a target path according to each node value and each directed edge value; and determining each address element included in the target path as the key address element.

In an embodiment, the computer program, when executed by the processor, causes the processor to perform the following steps: where when a geographic coordinate corresponding to any extended address is located in a fence corresponding to the fence identifier, the extended address is recorded as an intra-fence path; traversing each node and each directed edge in the path graph; calculating, according to a proportion of an intra-fence path including any node to all intra-fence paths, a node value of the node; calculating an out-degree of the node according to a quantity of directed edges pointed from the node; and calculating, according to a proportion of a quantity of directed edges in which the node is connected to a same node to the out-degree of the node, a directed edge value of a directed edge between the node and the same node.

In an embodiment, the computer program, when executed by the processor, causes the processor to perform the following steps: determining a parent node of each node according to each node value and each directed edge value; calculating an in-degree of each node according to a quantity of directed edges pointing to each node; marking a node having a zero in-degree as a head node, and marking a node having a zero out-degree as a tail node; determining the tail node as a first level node of the target path; and determining a parent node of the first level node as a second level node of the target path, and determining a parent node of the second level node as a third level node of the target path until a determined level node is the head node, to obtain the target path including a plurality of level nodes.

In an embodiment, the computer program, when executed by the processor, causes the processor to perform the following steps: determining another node of which a directed edge points to a current node as a preceding node of the current node; and calculate, when there are a plurality of preceding nodes, a link value of each preceding node relative to the current node according to a node value of each preceding node and a directed edge value of a directed edge used for connecting the current node and a corresponding preceding node, and determine a preceding node with a largest link value as a parent node of the current node.

In an embodiment, the computer program, when executed by the processor, causes the processor to perform the following steps: recognizing a POI text in the address text; and determining at least one of a combined POI text, an alias POI text, or a synonymous POI text as an extended POI text corresponding to the POI text, where when there are a plurality of POI texts, the combined POI text is obtained by combining the plurality POI texts, the alias POI text is obtained by querying an alias POI text associated with the POI text, and the synonymous POI text is obtained by performing synonymous replacement on a text word included in the POI text.

In an embodiment, the computer program, when executed by the processor, causes the processor to perform the following steps: searching for an associated address corresponding to each extended POI text and geographic coordinates corresponding to each associated address; and screening the geographic coordinates depending on whether an associated address corresponding to any of geographic coordinates corresponding to each associated address includes a key address element and whether the geographic coordinates are located in the target fence corresponding to the fence identifier.

In an embodiment, the computer program, when executed by the processor, causes the processor to perform the following steps: calculating, when the geographic coordinates corresponding to each associated address are screened out, a clustering density and a clustering distance of geographic coordinates corresponding to each extended address obtained through the screening; determining a target function for maximizing the clustering densities and the clustering distances of the geographic coordinates; and obtaining a value of the target function of the geographic coordinates corresponding to each extended address obtained through the screening, and determining geographic coordinates with a largest value of the target function as the processed coordinates.

In an embodiment, the computer program, when executed by the processor, causes the processor to perform the following steps: obtaining the associated address corresponding to each of the geographic coordinates obtained through the screening, and calculating a text similarity between the extended POI text and an associated POI text included in each associated address corresponding to the extended POI text; determining whether there is an associated address of which a text similarity exceeds a first threshold; recognizing, when a text similarity of any associated address exceeds the first threshold, identical geographic coordinates in the associated address and the extended address obtained through the screening, the identical geographic coordinates being recorded as intersection coordinates; and determining, when there are a plurality of intersection coordinates, intersection coordinates obtained through the screening as the processed coordinates according to a clustering feature of each of the intersection coordinates.

In an embodiment, the computer program, when executed by the processor, causes the processor to perform the following steps: traversing, when there are no intersection coordinates, geographic coordinates of a plurality of associated addresses obtained through the screening in descending order of text similarities; calculating a coordinate distance between geographic coordinates of each of the plurality of associated addresses obtained through the screening and the geographic coordinates corresponding to each extended address obtained through the screening; determining, when any coordinate distance obtained is less than a second threshold, geographic coordinates of an associated address corresponding to the coordinate distance as the processed coordinates; and determining, when there are still no geographic coordinates that cause the coordinate distance to be less than the second threshold after all the associated addresses have been traversed, geographic coordinates of an associated address with a highest text similarity as the processed coordinates.

A person of ordinary skill in the art may understand that all or some of the processes of the methods in the foregoing embodiments may be implemented by a computer program instructing relevant hardware. The program may be stored in a non-volatile computer-readable storage medium. When the program runs, the processes of the foregoing methods in the embodiments are performed. Any reference to a memory, a storage, a database, or another medium used in the embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. As an illustration instead of a limitation, the RAM is available in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM).

The technical features in the foregoing embodiments may be combined in different manners. For concise description, not all possible combinations of the technical features in the embodiments are described. However, provided that combinations of the technical features do not conflict with each other, the combinations of the technical features are considered as falling within the scope described in this specification.

The foregoing embodiments show only several implementations of the present disclosure and are described in detail, which, however, are not to be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the patent of the present disclosure shall be subject to the appended claims.

What is claimed is:

1. A geo-fence based coordinate data processing method, applied to a computer device, the method comprising:
    obtaining an address text and a fence identifier corresponding to the address text transmitted by a terminal device, the address text having a coordinate error that needs to be corrected, the coordinate error including that geographic coordinates extracted from the address text by using a geocoding service does not match a current fence station, and the fence identifier being a correct fence station that matches the address text;
    performing semantic extension on the address text to obtain a plurality of extended addresses;
    converting each of the extended addresses into corresponding geographic coordinates;
    for each extended address of the plurality of extended address, recognizing a key address element from multiple candidate address elements of the extended address, wherein a quantity of points of interest (POIs) indicated by the key address element is smaller than a quantity of POIs indicated by the multiple candidate address elements of the extended address;
    preliminary screening the geographic coordinates depending on whether an extended address corresponding to a geographic coordinate comprises the key address element and whether the geographic coordinate is located in a target fence corresponding to the fence identifier, to obtain one or more preliminary screened geographic coordinates;
    recognizing additional key address elements in the plurality of extended addresses;
    secondary screening the preliminary screened geographic coordinates depending on whether each of the extended addresses corresponding to the preliminary screened geographic coordinates comprises the additional key address elements and whether the preliminary screened geographic coordinates are located in the target fence corresponding to the fence identifier, to obtain one or more secondary screened geographic coordinates; and
    determining, according to a clustering feature of each of the secondary screened geographic coordinates, one of the secondary screened geographic coordinates as a processed coordinate, the processed coordinate being corrected coordinates for the address text.

2. The method according to claim 1, wherein the performing semantic extension on the address text to obtain a plurality of extended addresses comprises:
    obtaining a standard address associated with a point of interest (POI) text comprised in the address text;
    determining an address role of each address element in the standard address and an address role of each address element in the address text;
    determining a target address role that appears in the standard address but does not appear in the address text; and
    filling the target address text with the address element corresponding to the address role, to obtain an extended address.

3. The method according to claim 1, wherein the performing semantic extension on the address text to obtain a plurality of extended addresses comprises:
- filtering invalid text words in the address text, to obtain a valid address;
- determining an address role of each address element in the address text;
- recognizing whether the address text comprises all address roles in one or more role annotation sequences;
- recombining, when the address text comprises all the address roles in the role annotation sequence, address elements of the address text according to address roles appearing in the one or more role annotation sequences, to obtain one or more combined addresses, and deduplicating the valid address and the combined addresses, to obtain the plurality of extended addresses; and
- combining the address elements in the address text when the address text does not comprise all the address roles in the role annotation sequence, to obtain enumerated addresses, and deduplicating the valid address and the enumerated addresses, to obtain the plurality of extended addresses.

4. The method according to claim 1, wherein the recognizing key address elements in the plurality of extended addresses comprises:
- expanding a fence boundary of a fence corresponding to the fence identifier by a preset distance;
- determining whether the geographic coordinates corresponding to the plurality of extended addresses are located in the expanded fence;
- filtering out, when a geographic coordinate is not located in the expanded fence, an extended address corresponding to the geographic coordinate; and
- recognizing the key address element in the extended addresses obtained after the filtering.

5. The method according to claim 1, wherein the recognizing key address elements in the plurality of extended addresses comprises:
- constructing a path graph corresponding to the address text by using each address element comprised in the plurality of extended addresses as a node and using a neighborhood relationship between different address elements in a same extended address as a directed edge;
- calculating a node value of each node in the path graph and a directed edge value of a directed edge between any two neighboring nodes;
- determining a target path according to each node value and each directed edge value; and
- determining each address element comprised in the target path as the key address element.

6. The method according to claim 1, further comprising:
- recognizing a point of interest text in the address text; and
- determining at least one of a combined point of interest text, an alias point of interest text, or a synonymous point of interest text as an extended point of interest text corresponding to the point of interest text, wherein when there are a plurality of point of interest texts, the combined point of interest text is obtained by combining the plurality of point of interest texts, the alias point of interest text is obtained by querying an alias point of interest text associated with the point of interest text, and the synonymous point of interest text is obtained by performing synonymous replacement on a text word comprised in the point of interest text.

7. The method according to claim 5, wherein when a geographic coordinate corresponding to any extended address is located in a fence corresponding to the fence identifier, the extended address is recorded as an intra-fence path; and the calculating a node value of each node in the path graph and a directed edge value of a directed edge between any two neighboring nodes comprises:
- traversing each node and each directed edge in the path graph;
- calculating, according to a proportion of an intra-fence path comprising any node to all intra-fence paths, a node value of the node;
- calculating an out-degree of the node according to a quantity of directed edges pointed from the node; and
- calculating, according to a proportion of a quantity of directed edges in which the node is connected to a same node to the out-degree of the node, a directed edge value of a directed edge between the node and the same node.

8. The method according to claim 7, wherein the determining a target path according to each node value and each directed edge value comprises:
- determining a parent node of each node according to each node value and each directed edge value;
- calculating an in-degree of each node according to a quantity of directed edges pointing to the node;
- marking a node having a zero in-degree as a head node, and marking a node having a zero out-degree as a tail node;
- determining the tail node as a first level node of the target path; and
- determining a parent node of the first level node as a second level node of the target path, and determining a parent node of the second level node as a third level node of the target path until a determined level node is the head node, to obtain the target path comprising a plurality of level nodes.

9. The method according to claim 8, wherein the determining a parent node of each node according to each node value and each directed edge value comprises:
- determining another node of which a directed edge points to a current node as a preceding node of the current node; and
- calculating, when there are a plurality of preceding nodes, a link value of each preceding node relative to the current node according to a node value of each preceding node and a directed edge value of a directed edge used for connecting the current node and a corresponding preceding node, and determining a preceding node with a largest link value as a parent node of the current node.

10. The method according to claim 6, further comprising:
- searching for an associated address corresponding to each extended point of interest text and geographic coordinates corresponding to each associated address; and
- screening the geographic coordinates depending on whether an associated address corresponding to any geographic coordinates obtained through the searching comprises the key address element and whether the geographic coordinates are located in the target fence corresponding to the fence identifier.

11. The method according to claim 10, the determining, according to a clustering feature of each of the screened geographic coordinates, one of the screened geographic coordinates as a processed coordinate comprises:
- calculating, when the geographic coordinates corresponding to each associated address are screened out, a clustering density and a clustering distance of geographic coordinates corresponding to each extended address obtained through the screening;

determining a target function for maximizing the clustering densities and the clustering distances of the geographic coordinates; and obtaining a value of the target function of the geographic coordinates corresponding to each extended address obtained through the screening, and determining a geographic coordinate with a largest value of the target function as the processed coordinate.

12. The method according to claim 10, wherein the determining, according to a clustering feature of the geographic coordinates, geographic coordinates obtained through the screening as processed coordinates comprises:

obtaining an associated address corresponding to each of the geographic coordinates obtained through the screening, and calculating a text similarity between the extended point of interest text and an associated point of interest text comprised in each associated address corresponding to the extended point of interest text;

determining whether there is an associated address of which a text similarity exceeds a first threshold;

recognizing, when a text similarity of any associated address exceeds the first threshold, identical geographic coordinates in the associated address and the extended address obtained through the screening, the identical geographic coordinates being recorded as intersection coordinates; and determining, when there are a plurality of intersection coordinates, intersection coordinates obtained through the screening as the processed coordinates according to a clustering feature of each of the intersection coordinates.

13. The method according to claim 12, further comprising:

traversing, when there are no intersection coordinates, geographic coordinates of a plurality of associated addresses obtained through the screening in descending order of text similarities;

calculating a coordinate distance between geographic coordinates of each of the plurality of associated addresses obtained through the screening and the geographic coordinates corresponding to each extended address obtained through the screening;

determining, when any coordinate distance obtained is less than a second threshold, geographic coordinates of an associated address corresponding to the coordinate distance as the processed coordinates; and determining, when there are still no geographic coordinates that cause the coordinate distance is less than the second threshold after all the associated addresses have been traversed, geographic coordinates of an associated address with a highest text similarity as the processed coordinates.

14. A computer device, comprising a memory and a processor, the memory storing a computer program, and the computer program, when executed by the processor, causing the processor to perform a plurality of operations comprising:

obtaining an address text and a fence identifier corresponding to the address text transmitted by a terminal device, the address text having a coordinate error that needs to be corrected, the coordinate error including that geographic coordinates extracted from the address text by using a geocoding service does not match a current fence station, and the fence identifier being a correct fence station that matches the address text;

performing semantic extension on the address text to obtain a plurality of extended addresses;

converting each of the extended addresses into corresponding geographic coordinates;

for each extended address of the plurality of extended address, recognizing a key address element from multiple candidate address elements of the extended address, wherein a quantity of points of interest (POIs) indicated by the key address element is smaller than a quantity of POIs indicated by the multiple candidate address element of the extended address;

preliminary screening the geographic coordinates depending on whether an extended address corresponding to a geographic coordinate comprises the key address element and whether the geographic coordinate is located in a target fence corresponding to the fence identifier, to obtain one or more preliminary screened geographic coordinates;

recognizing additional key address elements in the plurality of extended addresses;

secondary screening the preliminary screened geographic coordinates depending on whether each of the extended addresses corresponding to the preliminary screened geographic coordinates comprises the additional key address elements and whether the preliminary screened geographic coordinates are located in the target fence corresponding to the fence identifier, to obtain one or more secondary screened geographic coordinates; and determining, according to a clustering feature of each of the secondary screened geographic coordinates, one of the secondary screened geographic coordinates as a processed coordinate, the processed coordinate being corrected coordinates for the address text.

15. The device according to claim 14, wherein the performing semantic extension on the address text to obtain a plurality of extended addresses comprises:

obtaining a standard address associated with a point of interest (POI) text comprised in the address text;

determining an address role of each address element in the standard address and an address role of each address element in the address text;

determining a target address role that appears in the standard address but does not appear in the address text; and filling the target address text with the address element corresponding to the address role, to obtain an extended address.

16. The device according to claim 14, wherein the performing semantic extension on the address text to obtain a plurality of extended addresses comprises:

filtering invalid text words in the address text, to obtain a valid address;

determining an address role of each address element in the address text;

recognizing whether the address text comprises all address roles in one or more role annotation sequences;

recombining, when the address text comprises all the address roles in the role annotation sequence, address elements of the address text according to address roles appearing in the one or more role annotation sequences, to obtain one or more combined addresses, and deduplicating the valid address and the combined addresses, to obtain the plurality of extended addresses; and combining the address elements in the address text when the address text does not comprise all the address roles in the role annotation sequence, to obtain enumerated addresses, and deduplicating the valid address and the enumerated addresses, to obtain the plurality of extended addresses.

17. The device according to claim 14, wherein the recognizing key address elements in the plurality of extended addresses comprises:
- expanding a fence boundary of a fence corresponding to the fence identifier by a preset distance;
- determining whether the geographic coordinates corresponding to the plurality of extended addresses are located in the expanded fence;
- filtering out, when a geographic coordinate is not located in the expanded fence, an extended address corresponding to the geographic coordinate; and
- recognizing the plurality of key address elements in the extended addresses obtained after the filtering.

18. The device according to claim 14, wherein the recognizing key address elements in the plurality of extended addresses comprises:
- constructing a path graph corresponding to the address text by using each address element comprised in the plurality of extended addresses as a node and using a neighborhood relationship between different address elements in a same extended address as a directed edge;
- calculating a node value of each node in the path graph and a directed edge value of a directed edge between any two neighboring nodes;
- determining a target path according to each node value and each directed edge value; and
- determining each address element comprised in the target path as the key address element.

19. The device according to claim 18, wherein when a geographic coordinate corresponding to any extended address is located in a fence corresponding to the fence identifier, the extended address is recorded as an intra-fence path; and the calculating a node value of each node in the path graph and a directed edge value of a directed edge between any two neighboring nodes comprises:
- traversing each node and each directed edge in the path graph;
- calculating, according to a proportion of an intra-fence path comprising any node to all intra-fence paths, a node value of the node;
- calculating an out-degree of the node according to a quantity of directed edges pointed from the node; and
- calculating, according to a proportion of a quantity of directed edges in which the node is connected to a same node to the out-degree of the node, a directed edge value of a directed edge between the node and the same node.

20. A non-transitory computer-readable storage medium, storing a computer program, the computer program, when executed by a processor, causing the processor to perform:
- obtaining an address text and a fence identifier corresponding to the address text transmitted by a terminal device, the address text having a coordinate error that needs to be corrected, the coordinate error including that geographic coordinates extracted from the address text by using a geocoding service does not match a current fence station, and the fence identifier being a correct fence station that matches the address text;
- performing semantic extension on the address text to obtain a plurality of extended addresses;
- converting each of the extended addresses into corresponding geographic coordinates;
- for each extended address of the plurality of extended address, recognizing a key address element from multiple candidate address elements of the extended address, wherein a quantity of points of interest (POIs) indicated by the key address element is smaller than a quantity of POIs indicated by the multiple candidate address element of the extended address;
- preliminary screening the geographic coordinates depending on whether an extended address corresponding to a geographic coordinate comprises the key address element and whether the geographic coordinate is located in a target fence corresponding to the fence identifier, to obtain one or more preliminary screened geographic coordinates;
- recognizing additional key address elements in the plurality of extended addresses;
- secondary screening the preliminary screened geographic coordinates depending on whether each of the extended addresses corresponding to the preliminary screened geographic coordinates comprises the additional key address elements and whether the preliminary screened geographic coordinates are located in the target fence corresponding to the fence identifier, to obtain one or more secondary screened geographic coordinates; and
- determining, according to a clustering feature of each of the secondary screened geographic coordinates, one of the secondary screened geographic coordinates as a processed coordinate, the processed coordinate being corrected coordinates for the address text.

\* \* \* \* \*